United States Patent
Idem et al.

(10) Patent No.: US 9,339,797 B2
(45) Date of Patent: May 17, 2016

(54) SULFUR TOLERANT CATALYSTS FOR HYDROGEN PRODUCTION BY CARBON DIOXIDE REFORMING OF METHANE-RICH GAS

(75) Inventors: Raphael Idem, Regina (CA); Ataullah Khan Mohammed, Regina (CA); Bappy Saha, Calgary (CA)

(73) Assignees: Raphael Idem (CA); Ataullah Khan Mohammed (CA); Bappy Saha (CA)

( * ) Notice: Subject to any disclaimer, the term of this patent is extended or adjusted under 35 U.S.C. 154(b) by 0 days.

(21) Appl. No.: 14/124,365

(22) PCT Filed: May 29, 2012

(86) PCT No.: PCT/CA2012/000520
§ 371 (c)(1),
(2), (4) Date: Feb. 3, 2014

(87) PCT Pub. No.: WO2012/167351
PCT Pub. Date: Dec. 13, 2012

(65) Prior Publication Data
US 2014/0134101 A1    May 15, 2014

Related U.S. Application Data

(60) Provisional application No. 61/494,523, filed on Jun. 8, 2011.

(51) Int. Cl.
*C01B 3/26* (2006.01)
*B01J 23/00* (2006.01)
(Continued)

(52) U.S. Cl.
CPC ............... *B01J 23/78* (2013.01); *B01J 23/002* (2013.01); *B01J 23/755* (2013.01); *B01J 23/83* (2013.01); *B01J 35/0053* (2013.01);
(Continued)

(58) Field of Classification Search
CPC ........ B01J 21/005; B01J 21/04; B01J 23/005; B01J 23/02; B01J 23/75; B01J 23/755; B01J 23/78; C01B 3/40; C01B 2203/1082
USPC ................. 502/327, 328, 335, 349, 355, 439; 423/651
See application file for complete search history.

(56) References Cited

U.S. PATENT DOCUMENTS 4,285,837 A * 8/1981 Sato et al. ...................... 502/335
4,988,661 A * 1/1991 Arai et al. ..................... 502/327
(Continued)

OTHER PUBLICATIONS

International Preliminary Report of Patentability for corresponding application No. PCT/CA2012/00520 dated Dec. 27, 2013.

*Primary Examiner* — Cam N. Nguyen
(74) *Attorney, Agent, or Firm* — Bereskin & Parr LLP/S.E.N.C.R.L., s.r.l.; Patricia Folkins

(57) ABSTRACT

The present application describes a catalyst that is suitable for the $CO_2$ reforming of methane-rich gases, such as biogas, that is resistant to poisoning by sulfur. The catalyst comprises from about 5 wt % to about 20 wt % Ni and 0 wt % to about 10 wt % Co supported on a support having a formula selected from: (a) $Al_2O_3$; (b) $M^1_aO_b$—$Al_2O_3$; and (c) $M^1_aO_b$—$ZrO_2$—$Al_2O_3$, where $M^1_aO_b$ is either CaO or MgO.

20 Claims, 19 Drawing Sheets

(51) Int. Cl.
*B01J 23/02* (2006.01)
*B01J 23/08* (2006.01)
*B01J 23/40* (2006.01)
*B01J 23/42* (2006.01)
*B01J 23/58* (2006.01)
*B01J 21/04* (2006.01)
*B01J 23/78* (2006.01)
*C01B 3/40* (2006.01)
*B01J 37/03* (2006.01)
*B01J 37/10* (2006.01)
*B01J 37/18* (2006.01)
*B01J 37/02* (2006.01)
*B01J 23/755* (2006.01)
*B01J 23/83* (2006.01)
*B01J 35/00* (2006.01)
*B01J 37/00* (2006.01)
*B01J 21/06* (2006.01)
*B01J 21/10* (2006.01)
*B01J 23/10* (2006.01)

(52) U.S. Cl.
CPC .......... *B01J 35/0066* (2013.01); *B01J 37/009* (2013.01); *B01J 37/0018* (2013.01); *B01J 37/0201* (2013.01); *B01J 37/0205* (2013.01); *B01J 37/031* (2013.01); *B01J 37/10* (2013.01); *B01J 37/18* (2013.01); *C01B 3/26* (2013.01); *C01B 3/40* (2013.01); *B01J 21/04* (2013.01); *B01J 21/066* (2013.01); *B01J 21/10* (2013.01); *B01J 23/02* (2013.01); *B01J 23/10* (2013.01); *C01B 2203/0238* (2013.01); *C01B 2203/1052* (2013.01); *C01B 2203/1058* (2013.01); *C01B 2203/1082* (2013.01)

(56) References Cited

U.S. PATENT DOCUMENTS

| | | | |
|---|---|---|---|
| 4,990,481 A * | 2/1991 | Sato et al. | 502/335 |
| 5,204,309 A * | 4/1993 | Vorob'iev et al. | 502/306 |
| 5,744,419 A | 4/1998 | Choudhary et al. | |
| 6,261,991 B1 * | 7/2001 | Numaguchi et al. | 502/337 |
| 6,293,979 B1 | 9/2001 | Choudhary et al. | |
| 7,411,106 B2 | 8/2008 | Xu et al. | |

* cited by examiner

SULFUR TOLERANT CATALYSTS FOR HYDROGEN PRODUCTION BY CARBON DIOXIDE REFORMING OF METHANE-RICH GAS

RELATED APPLICATIONS

This application is a national phase entry of PCT/CA2012/000520, filed May 29, 2012, which claims priority from U.S. provisional patent application Ser. No. 61/494,523, filed on Jun. 8, 2011, the contents of each of these applications being incorporated herein by reference in their entirety.

FIELD OF THE APPLICATION

The present application is in the field of contaminant-tolerant working catalysts for methane-rich gas reforming. In particular, the methane-rich gas is biogas.

BACKGROUND OF THE APPLICATION

Biogas is a methane-rich gaseous mixture which can be produced through anaerobic digestion of a variety of sources such as landfill waste, animal waste, waste water, food waste, and industrial waste. It is known by various names based on its source; for instance, biogas obtained from landfills is termed as landfill gas (LFG); the one obtained from waste water treatment plants (WWTP) is termed as digester gas (DG); and the one obtained from sludge waste digester is called sludge gas (SG). Approximately 55 million metric tons of carbon equivalent are released into the air each year by landfills in USA alone. The main driving force for the utilization of biogas is to avoid greenhouse gas (GHG) emissions and to lower gas emissions with extremely high ozone depletion potential (ODP). Its utilization will not only reduce uncontrolled emissions of GHGs but will also help to eliminate the wide range of pollutants found in this type of gas, which pose a threat to human health. The main constituents of biogas are methane (40-60%) and carbon dioxide (35-50%) [1]. Methane is a 21-25 times more powerful GHG than $CO_2$ [2]. Additionally, biogas contains small amounts of oxygen (0-3%) and nitrogen, and is also saturated with water vapor. Apart from its main components, biogas (specifically, LFG) also contains relatively high amounts of hydrogen sulfide and a broad spectrum of volatile organic compounds (VOC): organic-sulfur compounds (e.g. carbonyl sulphide, mercaptans), silicon-containing compounds (e.g. siloxanes), halogenated compounds, aromatics and aliphatic hydrocarbons [1]. The high energy content of biogas makes it an interesting energy source [3]. Due to its characteristics, treated (cleaned) biogas is already widely utilized in gas engines and turbines to produce heat and electricity [3]. The utilization of biogas, especially LFG, without treatment for power generation results in damage of downstream power generating units, since during combustion the halogenated compounds and sulfur-containing compounds are transformed into acid gases like $H_2SO_4$, HCl and HF, which cause corrosion problems. In addition, siloxanes are transformed into micro-crystalline silica, which deposits on the engine parts contributing to abrasion and poorer combustion efficiency [4]. If gas extraction rates do not warrant direct use or electricity generation, the gas can be flared. Less than 100 $m^3/h$ is a practical threshold for flaring [5]. In the landfill gas control hierarchy, gas collection with energy recovery is preferred to flaring [6]. Adsorption and absorption are the two most common technologies used in secondary gas treatment processing [6]. However, the state-of-the-art gas treating processes often fail because of technical or economic reasons, for example, low removal efficiencies, or high operational costs [7]. The World Bank's Global Gas Reduction Flaring Partnership (GGFR) is focused on reducing the $CO_2$ emissions arising from flaring of $CH_4$ associated with biogas such as from LFG and other sources [8]. Sustainable use of biogas for energy production does not contribute to $CO_2$ emissions production but has a high $CO_2$ abatement potential [9]. Therefore, there is immense potential in developing technology to utilize as-generated biogas for energy-related applications.

The major technological challenge for $CO_2$ reforming of biogas is the development of contaminant tolerant catalysts since biogas gas contains two main contaminants namely hydrogen sulfide ($H_2S$) and siloxanes. Biogas composition varies considerably depending on the origin and composition of the biomass and also on the method through which it is generated (thermophilic, mesophilic or psychrophilic). Most of the commonly employed reforming catalysts are prone to deactivation in the presence of $H_2S$ and other sulfur compounds [12]. The deactivation sets in on account of the formation of surface oxy-sulfides and/or sulfides [13]. Therefore, it poses a huge technological challenge to devise sulfur tolerant catalyst for biogas reforming [14]. To the best of the inventors' knowledge, there are no reports in the literature on the development of sulfur tolerant catalysts for $CO_2$ reforming of biogas.

Carbon formation is the other main drawback of $CO_2$ reforming of biogas, but second in importance to the earlier mentioned sulfur poisoning [13]. $CO_2$ reforming of biogas uses a high C/H feedstock which results in carbon deposition on the catalyst by CO disproportionation ($2CO \rightarrow CO_2+C$) and/or methane decomposition ($CH_4 \rightarrow 2H_2+C$) reactions [15]. The catalysts prepared with noble metals such as Rh, Ru and Pt showed the higher activity performance in $CO_2$ reforming of biogas because noble metals are very resistant to carbon formation. However, these materials are very expensive. Analysis shows that base metals such as Ni-based catalysts have high activity similar to that of noble metals, and are inexpensive. However, nickel catalysts are prone to coke formation [15-17]. Based on a thorough literature review, and to the best of the inventors' knowledge, it can be claimed that there are no reports on the development of sulfur tolerant working catalysts for $CO_2$ reforming of biogas in the literature. A recent publication of Mojdeh Ashrafi reports the use of a commercial catalyst 'Sued-Chemie G-90' for the steam reforming of biogas [18]. Most of the research papers dealing with biogas reforming have employed a treated/cleaned biogas ($H_2S$ and siloxane free) for their catalytic tests [19-21].

State of the Art in $CO_2$ Reforming of $CH_4$

The Hydrogen Production Research Group (HPRG) at the University of Regina has considerable experience and expertise in the field of $CO_2$ reforming of methane [22, 23]. The HPRG group has reported the development of 5 wt. % $Ni/Ce_{0.6}Zr_{0.4}O_2$ catalyst for the $CO_2$ reforming of $CH_4$ in 2006 and tested the same for 230 h for the above application [23-26]. In their most recent publication, the use of steam to assist in the $CO_2$ reforming ($H_2O/CO_2/CH_4$) process in an attempt to mitigate coke deposition over 5 wt. % $Ni/Ce_{0.6}Zr_{0.4}O_2$ binary oxide supported catalysts was reported [27]. The results obtained were not so encouraging. The inherent hydrophilic nature of the ceria-zirconia support offered reduced sensitivity to water inhibition of active sites leading to catalyst deactivation [27]. Thus, in order to find a better catalyst formulation with improved surface structure, morphology, reducibility, redox ability, basicity and steam tolerance (i.e. reduced hydrophilicity), a portfolio of ternary oxide supports of the general formula $Ce_{0.5}Zr_{0.33}M_{0.17}O_2$ were synthesized using the surfactant (CTAB) assisted route [28] and their catalytic activity was evaluated for $CO_2$ reforming of $CH_4$ at 800° C. in the presence and absence of steam in comparison with those for binary oxides supported catalysts. The results obtained were very good and three catalysts formulation namely $5Ni/Ce_{0.5}Zr_{0.33}Mo_{0.17}O_2$ (where M=Ca, La, Y) were found to be active for $CO_2$ reforming of $CH_4$ both in the presence and absence of steam. Furthermore, their ability to catalyze $CO_2$ reforming of $CH_4$ in the presence of steam was established even at 500° C. reaction temperature. The long term (100 h) performance tests over $5Ni/Ce_{0.5}Zr_{0.33}Ca_{0.17}O_2$ catalyst for $CO_2$ reforming of $CH_4$ were extremely successful [28].

This set of results was thought to be useful for biogas which is usually saturated with water. Consequently, the three catalysts i.e., $5Ni/Ce_{0.5}Zr_{0.33}M_{0.17}O_2$ (where M=Ca, La, Y) were tested for $CO_2$ reforming of $CH_4$ using a methane-rich mixture, ($CH_4/CO_2=1.25$) at 800° C. operating temperature. From the obtained results it was noted that the 800° C. reaction temperature was not sufficient to enable the $CO_2$ reforming process of methane-rich mixtures on account of severe catalyst coking. In order to tackle the problem of catalyst coking (deactivation) at 800° C., the temperature was raised to 900° C., which resolved the problem of catalyst deactivation [28]. In order to simulate real biogas, 100 ppmv $H_2S$ was introduced at this stage. The activity results (800° C. and 900° C. operating temperature) with the above feed revealed that the above catalysts were not suitable for the above application due to the affinity of the ceria-based supports $Ce_{0.5}Zr_{0.33}M_{0.17}O_2$ (where M=Ca, La, Y) to the sulphur compounds ($H_2S$) as shown in FIG. 1.

It is well known in the literature that $H_2S$ reacts rapidly with $CeO_2$ forming surface oxysulfide (CeOS) and surface sulfide ($CeS_2$) species.

SUMMARY OF THE APPLICATION

The current application is related to the development of a novel catalytic technology to convert untreated biogas, a methane-rich gas, to syngas with a high concentration of hydrogen. This gas can be used as fuel in fuel cells for power production or vehicle propulsion or the hydrogen can be used in gas engines for vehicle propulsion. Alternatively, the above reformate or syngas can also be used in the production of synthetic liquid fuels by the Fisher Tropsch synthesis process (FTS). Because of economics, hydrogen is currently produced from fossil fuels through steam reforming [10]. The current development is based on the catalytic dry reforming of biogas in the as-generated form without much prior gas treatment. Definitely, there are certain advantages associated with the dry reforming of biogas. Biogas contains primarily $CH_4$ and $CO_2$, which are also the reactants needed for the dry reforming process. Therefore, the developed catalytic technology has the ability to synchronize the biogas feed and dry reforming process on a novel catalytic platform in order to exploit maximum benefits from them.

The developed catalytic technology will have two fold benefits. On the one hand, it will help in the avoidance of GHG emissions by eliminating flaring and venting methods that are currently being practiced worldwide. On the other hand, it will generate renewable and cheap hydrogen-rich syngas from the biogas feed, which would otherwise be environmentally harmful (if emitted). The successful implementation of the proposed catalytic technology at various biogas sources such as landfill sites, municipal waste water treatment plants and livestock farming sites, and even "dirty natural gas" will help in generating revenue from both the hydrogen generated and from the carbon credits valuation scheme. The valuation of carbon credits and assessment of GHG reduction have recently been valued at \$15 per ton $CO_2$ [11]. For example, landfill sites are common and local to any human habitation and can be a source of cheap renewable form of energy. For instance the province of Saskatchewan has currently about 600 operational landfill sites and the City of Regina's landfill site located on Fleet Street alone has a capacity of producing 250-350 acfm landfill gas, with a high heating value (HHV) of 16-18 $MJ/m^3$ [11]. Hence the landfill sites hold immense potential waiting to be explored.

The current application describes contaminant-tolerant working catalysts for biogas reforming. The catalysts of the application are also applicable to "associated gas" from oil production and low quality natural gas commonly referred to as "dirty gas" since the latter two gases have compositions similar to biogas.

The design and development of novel ceria-free catalyst formulations was undertaken in order to tackle the problem of sulphur poisoning. Accordingly, alumina-based supports were chosen on account of their relative tolerance towards $H_2S$. In order to improve the coke tolerance of the catalysts, basic oxide additives were added to the support formulations.

The active components chosen were Ni (monometallic) and combination of Ni+Co (bimetallic). Ni is the most commonly employed base metal in various reforming catalysts and Co was added as a sacrificial element in order to improve the sulfur tolerance of Ni element.

Accordingly, the present application includes a catalyst comprising from about 5 wt % to about 20 wt % Ni and 0 wt % to about 10 wt % Co supported on a support having a formula selected from:

$Al_2O_3$; (a)

$M^1_aO_b$—$Al_2O_3$; and (b)

$M^1_aO_b$—$ZrO_2$—$Al_2O_3$, (c)

wherein
$M^1_a\%$ is a metal oxide salt in which
a is 1 and b is 1 or 2, or a is 2 and b is 3; and
$M^1$ is selected from Mg and Ca.

In an embodiment of the present application the catalyst support is prepared using a surfactant-assisted method. That is, precursor salts of each of metal oxides are dissolved in an aqueous solution and this solution is combined with an aqueous solution comprising an ionic surfactant. The resulting mixture is then treated with a base to form the support which precipitates from solution forming a slurry. The resulting slurry is hydrothermally aged for a suitable amount of time, then the precipitate is collected by any known means, such as filtration, and the resulting material is dried and calcined.

In an embodiment of the application, the Ni and Co (when present) is added to the support using a wet impregnation method. In the case of bimetallic catalysts, the supports are impregnated with the metals using either simultaneous, reverse step-wise or step-wise impregnation methods.

The present application further includes a process for the conversion of a methane-rich gaseous mixture into hydrogen comprising (a) activating a catalyst of the formula (I) as defined above under reducing conditions; and (b) contacting a reactant comprising the methane-rich gaseous mixture with the activated catalyst under conditions for the conversion of the methane-rich gaseous mixture into a product comprising hydrogen.

Other features and advantages of the present application will become apparent from the following detailed description. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

The embodiments of the application will now be described in greater detail with reference to the attached drawings in which.

DETAILED DESCRIPTION OF THE APPLICATION

I. Definitions

Figure 1:
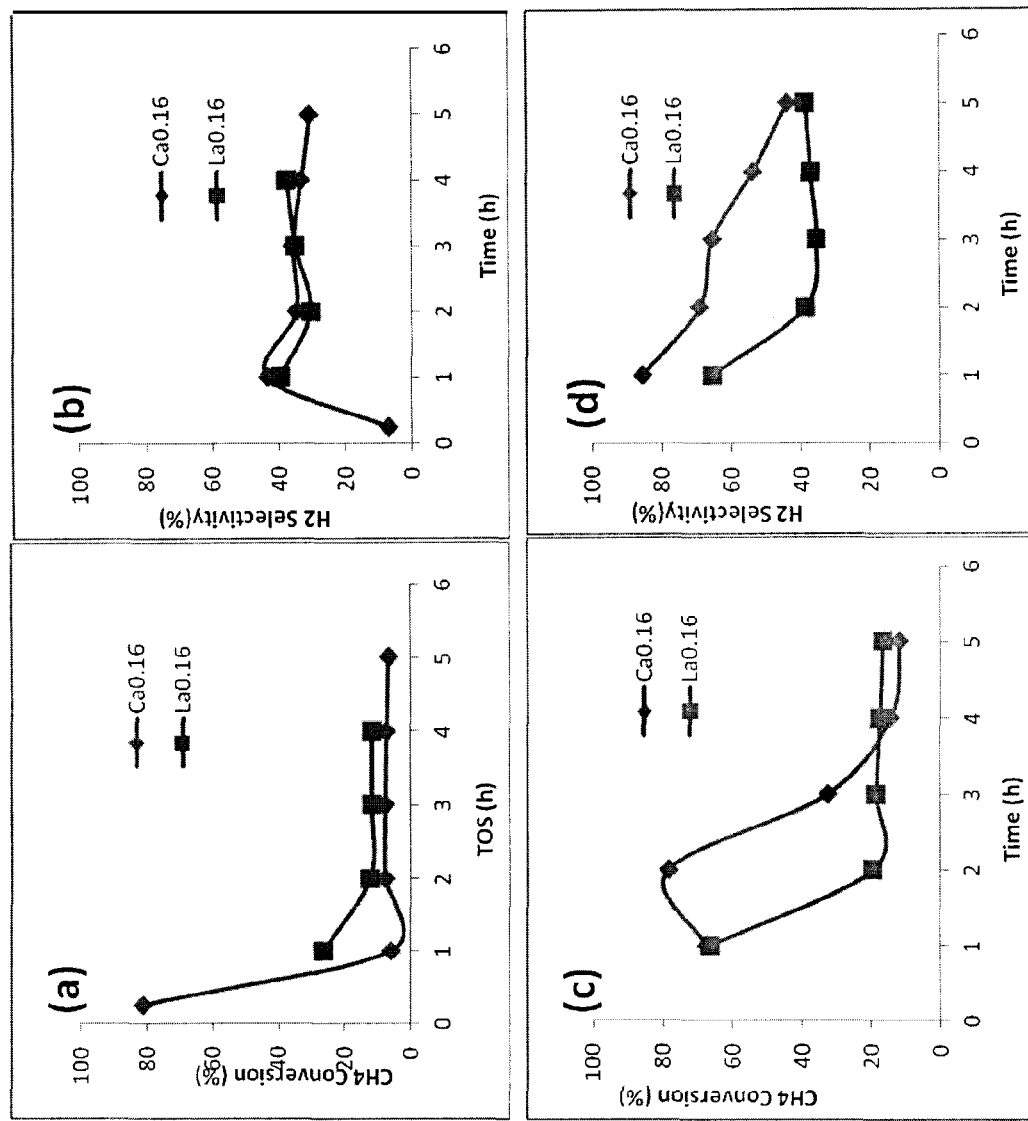
FIG. 1: graphs showing the activity of a prior art ceria-based ternary oxide catalyst $5Ni/Ce_{0.5}Zr_{0.33}Mo_{0.166}O_2$ (Where M=Ca and La) (CTAB/Metal=0.5) for $CO_2$ reforming of biogas at 800° C. (a) & (b) and 900° C. (c) & (d) operating temperatures. [T=800/900° C.; Feed Composition: $CH_4/CO_2/N_2$=50/40/10 vol. %+100 ppmv $H_2S$; Feed flow rate=100 sccm; $W/F_{CH4}$=1.19 g·cat·h/mol. $CH_4$].

Unless otherwise indicated, the definitions and embodiments described in this and other sections are intended to be applicable to all embodiments and aspects of the disclosure herein described for which they are suitable as would be understood by a person skilled in the art.

The term "suitable" as used herein means that the selection of the particular compound or conditions would depend on the specific synthetic manipulation to be performed, but the selection would be well within the skill of a person trained in the art. All process steps described herein are to be conducted under conditions sufficient to provide the desired product. A person skilled in the art would understand that all reaction conditions, including, for example, reaction solvent, reaction time, reaction temperature, reaction pressure, reactant ratio and whether or not the reaction should be performed under an anhydrous or inert atmosphere, can be varied to optimize the yield of the desired product and it is within their skill to do so.

The terms "a," "an," or "the" as used herein not only include aspects with one member, but also includes aspects with more than one member. For example, an embodiment including "a metal" should be understood to present certain aspects with one metal or two or more additional different metals.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The term "methane-rich gaseous mixture" as used herein refers to a mixture of gas comprising at least about 25%, about 30%, about 35% or about 40% methane ($CH_4$).

The term "biogas" as used herein refers to a methane-rich gaseous mixture produced by the anaerobic digestion of organic matter.

II. Catalysts of the Application

To develop hydrogen sulphide tolerant catalysts, alumina based supports were formulated. In order to improve the decoking ability of the support, the basicity/acidity of the supports was varied by adding basic/acidic oxide dopants to the support formulation. Nickel was chosen as the active species for the $CO_2$ reforming of $H_2S$ laden biogas. Cobalt was added as a sacrificial element to improve the sulfur tolerance of the nickel species. The surfactant/metal molar ratio was adjusted during support preparation to both minimize cost and reduce waste.

By employing an intelligent and tailor designed synthetic strategy, the current application has succeeded in bringing various desirable traits into a given catalyst formulation; namely, high metal dispersion, high reducibility, high pore volume/surface area and residual basicity in the support, thus leading to the development of sulfur tolerant catalysts for the $CO_2$ reforming of $CH_4$ from biogas.

Accordingly, the present application includes a catalyst comprising from about 5 wt % to about 20 wt % Ni and 0 wt % to about 10 wt % Co supported on a support having a formula selected from:

$$Al_2O_3; \quad (a)$$

$$M^1_aO_b—Al_2O_3; \text{ and} \quad (b)$$

$$M^1_aO_b—ZrO_2—Al_2O_3, \quad (c)$$

wherein
$M^1_aO_b$ is a metal oxide salt in which
a is 1 and b is 1 or 2, or a is 2 and b is 3; and
$M^1$ is selected from Mg and Ca.

In an embodiment of the application, $M^1$ is selected from Mg and Ca. In another embodiment, $M^1_aO_b$ is selected from MgO and CaO (i.e. a is 1 and b is 1).

In an embodiment of the support is $Al_2O_3$.

In another embodiment, the support is $M^1_aO_b$—$Al_2O_3$. In a further embodiment the support is selected from MgO—$Al_2O_3$ and CaO—$Al_2O_3$.

In another embodiment, the support is $M^1_aO_b$—$ZrO_2$—$Al_2O_3$. In a further embodiment, the support is MgO—$ZrO_2$—$Al_2O_3$ and CaO—$ZrO_2$—$Al_2O_3$ In an embodiment of the application, the Ni is present in the catalyst in an amount (wt % based on the weight of the total catalyst) of about 10, 10.5, 11, 11.5, 12, 12.5, 13, 13.5, 14, 14.5 or 15 weight percent. In another embodiment, the Ni is present in the catalyst in an amount of about 13, 13.5, 14, 14.5, 15, 15.5, 16, 16.5 or 17 weight percent. In another embodiment, the Ni is present in the catalyst in an amount of about 15 weight percent.

In an embodiment of the application, the Co is present in the catalyst in an amount (wt % based on the weight of the total catalyst) of about 0.5, 1, 1.5, 2, 2.5, 3, 3.5, 4, 4.5, 5, 5.5, 6, 6.5, 7, 7.5 or 8 weight percent. In another embodiment, the Co is present in the catalyst in an amount of about 4, 4.5, 5, 5.5 or 6 weight percent. In another embodiment, the Co is present in the catalyst in an amount of about 5 weight percent. In another embodiment of the application Co is not present in the catalyst.

The Ni and Co are present in the prepared catalyst in any form, including for example as an oxide. Prior to use as a catalyst, the catalysts are treated under reducing conditions to provide the active form of the metal. Examples of reducing conditions, include, but are not limited to, treating the catalysts with a gas mixture comprising $H_2$, for example about 1% to about 10%, or about 5%, $H_2$ in $N_2$, at a temperature of about 500° C. to about 1000° C., for example about 700° C., for about 1 hour to about 10 hours, for example about 3 hours.

In an embodiment of the application, the catalyst is selected from:
15% Ni/$Al_2O_3$;
15% Ni/MgO—$Al_2O_3$;
15% Ni/Ca—O—$Al_2O_3$;
15% Ni/$La_2O_3$—$Al_2O_3$;
15% Ni+5% Co/$Al_2O_3$;
15% Ni+5% Co/Ca—O—$Al_2O_3$;
15% Ni+5% Co/MgO—$Al_2O_3$;
15% Ni→5% Co/$Al_2O_3$;
15% Ni→5% Co/Ca—O—$Al_2O_3$;
15% Ni→5% Co/MgO—$Al_2O_3$;
5% Co→15% Ni/Ca—O—$Al_2O_3$;
5% Co→15% Ni/$Al_2O_3$;
5% Co→15% Ni/MgO—$Al_2O_3$;
5% Co→15% Ni/MgO—$ZrO_2$—$Al_2O_3$; and
5% Co→15% Ni/Ca—O—$ZrO_2$—$Al_2O_3$,
wherein the "Ni+Co" means that the catalyst is prepared using a simultaneous impregnation method, "Co→Ni" means that the catalyst is prepared using a reverse step-wise impregnation method with Co being impregnated on the support prior to Ni and "Ni→Co" means that the catalyst is prepared using a step-wise impregnation method with Ni being impregnated on the support prior to Co and the support is prepared using the surfactant assisted method with a surfactant/metal ratio of 0.5.

In an embodiment of the application, the catalyst is selected from:
15% Ni/$Al_2O_3$;
15% Ni/MgO—$Al_2O_3$;
15% Ni/Ca—O—$Al_2O_3$;

15% Ni+5% Co/Al$_2$O$_3$;
15% Ni+5% Co/Ca—O—Al$_2$O$_3$;
15% Ni+5% Co/MgO—Al$_2$O$_3$;
15% Ni→5% Co/Al$_2$O$_3$;
15% Ni→5% Co/MgO—Al$_2$O$_3$;
15% Ni→5% Co/Ca—O—Al$_2$O$_3$;
5% Co→15% Ni/Al$_2$O$_3$;
5% Co→15% Ni/MgO—Al$_2$O$_3$;
5% Co→15% Ni/Ca—O—Al$_2$O$_3$;
5% Co→15% Ni/MgO—ZrO$_2$—Al$_2$O$_3$; and
5% Co→15% Ni/Ca—O—ZrO$_2$—Al$_2$O$_3$.

In an embodiment of the application, the catalyst supports are prepared using a surfactant assisted method. In an embodiment, the surfactant assisted method comprises: (i) combining aqueous solutions of precursor salts of each metal oxide, with an aqueous solution of at least one surfactant; (ii) stirring the combination for a suitable time; (iii) adding a suitable base to adjust the pH of the combined solutions to about 10 to about 13 to produce a slurry comprising precipitated support; (iv) allowing the slurry to age at elevated temperatures for a suitable time; (v) isolating the precipitated support from the slurry; (vi) optionally washing the isolated support to remove residual surfactant or solvent and (vii) drying and calcining the isolated support.

In an embodiment if the application, the solutions of metal oxide precursors and surfactant are combined and mixed at room temperature or at elevated temperatures, for example, at about 40° C. to about 80° C. In embodiments of the application, the combined solution is mixed for about 30 to 130 minutes.

In an embodiment of the application, the base used in the surfactant assisted method is aqueous ammonia. More particularly, the pH of the combined solution is adjusted to about 11 to about 12 by the addition of the base. Optionally, the pH of the slurry may be readjusted by the addition of a base after step (iv) above.

In an embodiment of the application, the slurry is aged hydrothermally in a sealed vessel by heating to a temperature of about 80 to about 100° C., suitably about 90° C. Further, in an embodiment of the application, the slurry is aged for about 1 day to about 10 days, suitably, about 3 days to about 6 days. In another embodiment of the invention, the slurry is cooled prior to isolation of the support.

In an embodiment of the application, the precipitated support is separated from the slurry in step (v) above by filtration.

In an embodiment of the application the filtered supports are oven-dried and then calcined. For example, the supports are dried at about 100° C. to about 140° C. for about 6 hours to about 24 hours and then calcined at about 600° C. to about 700° C. for about 1 to about 5 hours. Suitably drying and calcination are carried out in air.

In an embodiment of the application the ionic surfactant is a cationic, anionic, amphoteric or zwitterionic surfactant. In a further embodiment the ionic surfactant is a cationic surfactant. In a further embodiment, the molar ratio of surfactant to metal (surfactant/[M$^1$+Zr+Al] is about 0.1 to about 5, about 0.2 to 2, about 0.3 to about 1.25, or about 0.3.

In an embodiment of the application, the ionic surfactant is a cationic surfactant such as a tetraalkyl ammonium salt, in which the length of the alkyl group varies from C6 to C18, in which C6 represents an alkyl group containing six carbon atoms in the alkyl chain and C18 represents an alkyl group containing 18 carbon atoms in the alkyl chain. The alkyl chain is either straight or branched or optionally contains double or triple bonds. Suitably, the length of the alkyl group is C16, which is also known as cetyl or hexadecyl. In embodiment of the application, the tetraalkylammonium salt is, for example, an alkyltrimethyl ammonium salt, such as an alkyltrimethyl ammonium chloride, bromide or hydroxide. In a further embodiment of the application, the tetraalkylammonium salt is cetyl trimethyl ammonium bromide (CTAB). In an embodiment of the application, the molar ratio of CTAB to metal precursor (surfactant/[M$^1$+Zr+Al] is about 0.2 to 0.6, suitably about 0.3 to about 0.5.

In another embodiment of the application, the ionic surfactant is an anionic surfactant such as an alkyl sulfate salt (SDS), in which the length of the alkyl group varies from C6 to C18, in which C6 represents an alkyl group containing six carbon atoms in the alkyl chain and C18 represents an alkyl group containing 18 carbon atoms in the alkyl chain. The alkyl chain is either straight or branched or optionally contains double or triple bonds. Suitably, the length of the alkyl group is C12, which is also known as dodecyl. In an embodiment of the application, the alkyl sulfate salt is, for example, sodium dodecyl sulfate (SDS).

In a further embodiment the surfactant is an amphoteric surfactant such as cocamidopropyl betaine (CAPB).

In another embodiment of the application, the surfactant for preparing the support is oligomeric and includes co-polymers such as pluronics. These amphiphilic polymers comprise polypropylene oxide block (PO) which is surrounded by two hydrophilic polyethylene oxide blocks (EO).

The general formula of the amphiphilic polymer is represented as $(EO)_a$-$(PO)_b$-$(EO)_c$. There are a number of different pluronics which are available, each with a different molecular weight and a EO/PO molar ratio. In a specific embodiment of the application, the triblock copolymer Pluronic™ 123 (P-123) is used, which has the schematic structure of $(EO)_{20}$-$(PO)_{70}$-$(EO)_{20}$.

In an embodiment of the application, the Ni and Co (when present) are added to the support using a wet impregnation method. For example the pre-made support is immersed in aqueous solutions of metal precursors, such the corresponding nitrate salts, and the resulting mixture stirred and slowly heated under conditions, for example in a hot water bath, to remove excess water (i.e. dried). Suitable metal precursors include, but are not limited to Ni(NO$_3$)$_2$.H$_2$O and Co(NO$_3$)$_2$.4H$_2$O. In an embodiment, the aqueous solutions of the metal precursors have a concentration of precursor salt of about 0.01M to about 1M, about 0.05 M to about 0.5 M or about 0.1M. In the case of bimetallic catalysts, the supports are impregnated with the metals using either simultaneous or step-wise impregnation methods. In the simultaneous method, the support is immersed in an aqueous solution comprising both metal precursor salts, and then calcined at about 600° C. to about 700° C., or about 650° C., for about 1 hour to about 5 hours, or about 3 hours. In the step-wise method, the support is first immersed in an aqueous solution of one of the metal precursor salts, followed by calcination at about 600° C. to about 700° C., or about 650° C., for about 1 hour to about 3 hours, or about 1.5 hours, and then the support (already impregnated with the first metal salt), is immersed in an aqueous solution of the second metal precursor salt, followed by calcination at about 600° C. to about 700° C., or about 650° C., for about 1 hour to about 3 hours, or about 1.5 hours. The order of impregnation may be Co salt followed by Ni salt (Co→Ni) (reverse step-wise) or Ni salt followed by Co salt (Ni→Co) (step-wise). In an embodiment, the support is impregnated with the Co salt followed by the Ni salt (Co→Ni). In an embodiment, the support is impregnated with the Ni salt followed by the Co salt (Ni→Co). In an embodiment of the application the supports are impregnated with Ni and Co using a simultaneous impregnation method (Ni+Co).

III. Processes of the Application

The present application further includes a process for the conversion of a methane-rich gaseous mixture into hydrogen comprising (a) activating a catalyst of the formula (I) as defined above under reducing conditions; and (b) contacting a reactant comprising the methane-rich gaseous mixture with the activated catalyst under conditions for the conversion of the methane-rich gaseous mixture into a product comprising hydrogen.

In an embodiment of the application the catalysts of the formula (I) are activated in situ during the course of the process. In a further embodiment, the conditions to activate the catalysts of formula (I) comprise treating the catalysts with a gas mixture comprising $H_2$, for example about 1% to about 10%, or about 5%, $H_2$ in $N_2$, at a temperature of about 500° C. to about 1000° C., for example about 700° C., for about 1 hour to about 10 hours, for example about 3 hours.

In an embodiment of the application, the methane-rich gaseous mixture is a biogas. In an embodiment, the biogas is, for example, but not limited to, landfill gas, digester gas and sludge gas, but can also be biogas from any available source. In an embodiment of the application, the methane-rich gaseous mixture comprises $H_2S$ and/or organosulfur compounds.

The conditions for the conversion of the reactant comprising a methane-rich gaseous mixture to product comprising $H_2$ are any known reforming process for $CO_2$ reforming of methane and other hydrocarbons.

In an embodiment of the application, the reforming reaction is dry reforming of methane and the reactant comprises the methane-rich gas and carbon dioxide ($CO_2$) and the conditions for the conversion of the methane-rich gas into a product comprising hydrogen comprise a temperature of about 700° C. to about 1000° C., or about 800° C. to about 900° C., at a pressure of 1 atm. When $H_2S$ is present in the methane-rich gas, it is an embodiment that the reforming reaction is performed at a temperature of about 850° C. to about 950° C. or at about 900° C. In an embodiment, the molar ratio of methane ($CH_4$) to $CO_2$ is about 1:1 to about 1:1.5, about 1:1 to about 1:1.25, or about 1:1.

In an embodiment of the reaction, the product comprising hydrogen further comprises carbon dioxide, carbon monoxide and/or water. When the product comprises hydrogen and carbon monoxide, this mixture is known as syngas.

In an embodiment of the application, the process is performed as a continuous process where the reactant comprising methane-rich gas is in the form of a gaseous, liquid or vaporized input stream and the hydrogen product is comprised in an output stream that is optionally treated using known methods to separate and purify the hydrogen gas for use as a fuel or any other known purpose (such as a reactant in chemical synthesis). In this embodiment, the catalyst is packed or housed in a packed bed tubular reactor (PBTR) and the input stream is passed through the PBTR.

The following non-limiting examples are illustrative of the present application:

V. Examples

EXAMPLE 1

Preparation of Sulfur Tolerant Single and Binary Oxide Supports

All the supports employed for the current application are based on $Al_2O_3$ and their nominal composition is represented as $M^1_aO_b$—$Al_2O_3$. When $M^1_aO_b$ is not present, this results in the single oxide support, $Al_2O_3$. In the current study different alumina based binary oxide supports were synthesized in 1:3 ($M^1_aO_b/Al_2O_3$) molar oxide ratio (where M=Ca, Gd, La, Mg and Y) by the surfactant-assisted route. All the preparations described below were normalized to yield 15 g sample per batch/preparation. The synthetic route employed in the study was based on a modification of a 'surfactant assisted route' by Idem et al. (2010) [22, 23], wherein nitrate salts of different metal ions were hydrolyzed together along with a surfactant-cetyl trimethyl ammonium bromide (CTAB) under basic conditions, and subsequently aged hydrothermally under autogenous pressure at 90° C. for 60 h. The molar ratio of CTAB/[Al+$M^1$] was ~0.5 (where $M^1$=Ca, Gd, La, Mg and Y). This ratio was used to minimize the use of CTAB in order to minimize both waste generated and cost in catalyst production. Other molar ratios of CTAB/[Al+$M^1$] of 0.3 and 1.25 were used for comparison, and to prove that surfactant/metal molar ratio of 0.5 was optimal. It is notable that all the sulfur tolerant single and binary oxide supports reported herein were prepared by analogous procedures, to allow direct comparison of their catalytic properties.

(a) Preparation of $Al_2O_3$ Support

In order to prepare 15 g of $Al_2O_3$ support 110.35 g of $Al(NO_3)_3.9H_2O$ salt was dissolved in deionized water to form a metal nitrate solution. Separately 53.6 g of cetyltrimethyl ammonium bromide (CTAB) was dissolved in deionized warm water (60° C.) to form the surfactant solution. The metal nitrate and surfactant solutions were mixed together under constant stirring to form a metal nitrate-surfactant mixture solution. The ratio of CTAB/Al in the mixture solution was maintained ~0.5. The mixture solution was hydrolyzed by the addition of aqueous ammonia until the pH reached ~11.6 which resulted in the precipitation of metal hydroxide-surfactant matrix in the form of colloidal slurry. The slurry was rigorous stirred for 0.5 h and then sealed in an air-tight Pyrex glass bottle and subsequently aged hydrothermally at 90° C. for 5 days in conventional oven under autogenous pressure. After 5 day aging, the slurry was removed from the oven, cooled to room temperature and then filtered. The filtered precipitate was washed with warm deionized water in order to remove the unused surfactant. The precipitate was dried at 120° C. overnight and subsequently calcined at 650° C. for 3 h in ambient air environment.

(b) Preparation of CaO—$Al_2O_3$ Support

In order to prepare 15 g of CaO—$Al_2O_3$ support, 9.8 g of $Ca(NO_3)_2.4H_2O$ and 93.25 g of $Al(NO_3)_3.9H_2O$ salts were used. The corresponding metal nitrates were dissolved separately in deionized water and then mixed together to form a mixed nitrate solution. Separately 52.9 g of cetyltrimethyl ammonium bromide (CTAB) was dissolved in deionized warm water (60° C.) to form the surfactant solution. The mixed nitrate and surfactant solutions were mixed together under constant stirring to form a nitrate-surfactant mixture solution. The ratio of [CTAB/(Ca+Al)] in the mixture solution was maintained ~0.5. The mixture solution was hydrolyzed by the addition of aqueous ammonia until the pH reached ~11.6 which resulted in the precipitation of mixed metal hydroxide-surfactant matrix in the form of colloidal slurry. The slurry was rigorous stirred for 0.5 h and then sealed in an air-tight Pyrex glass bottle and subsequently aged hydrothermally at 90° C. for 5 days in conventional oven under autogenous pressure. After 5 day aging, the slurry was removed from the oven, cooled to room temperature and then filtered. The filtered precipitate was washed with warm deionized water in order to remove the unused surfactant. The precipitate was dried at 120° C. overnight and subsequently calcined at 650° C. for 3 h in ambient air environment. Two other batches of CaO—$Al_2O_3$ support were by varying the surfactant/metal molar ratio, accordingly 31.7 g of CTAB was employed in order to attain CTAB/(Ca+Al)=0.3 and for CTAB/(Ca+Al)=1.25, 132.15 g CTAB was employed.

(c) Preparation of $Gd_2O_3$—$Al_2O_3$ Support

In order to prepare 15 g of $Gd_2O_3$—$Al_2O_3$ support, 20.25 g of $Gd(NO_3)_3 \cdot 6H_2O$ and 50.5 g of $Al(NO_3)_3 \cdot 9H_2O$ salts were used. The corresponding metal nitrates were dissolved separately in deionized water and then mixed together to form a mixed nitrate solution. Separately 16.4 g of cetyltrimethyl ammonium bromide (CTAB) was dissolved in deionized warm water (60° C.) to form the surfactant solution. The mixed nitrate and surfactant solutions were mixed together under constant stirring to form a nitrate-surfactant mixture solution. The ratio of [CTAB/(Gd+Al)] in the mixture solution was maintained ~0.5. The mixture solution was hydrolyzed by the addition of aqueous ammonia until the pH reached ~11.6 which resulted in the precipitation of mixed metal hydroxide-surfactant matrix in the form of colloidal slurry. The slurry was rigorous stirred for 0.5 h and then sealed in an air-tight Pyrex glass bottle and subsequently aged hydrothermally at 90° C. for 5 days in conventional oven under autogenous pressure. After 5 day aging, the slurry was removed from the oven, cooled to room temperature and then filtered. The filtered precipitate was washed with warm deionized water in order to remove the unused surfactant. The precipitate was dried at 120° C. overnight and subsequently calcined at 650° C. for 3 h in ambient air environment.

(d) Preparation of MgO—$Al_2O_3$ Support

In order to prepare 15 g of MgO—$Al_2O_3$ support, 11.1 g of $Mg(NO_3)_2 \cdot 6H_2O$ and 97.5 g of $Al(NO_3)_3 \cdot 9H_2O$ salts were employed. The corresponding metal nitrates were dissolved separately in deionized water and then mixed together to form a mixed nitrate solution. Separately 55.2 g of cetyltrimethyl ammonium bromide (CTAB) was dissolved in deionized warm water (60° C.) to form the surfactant solution. The mixed nitrate and surfactant solutions were mixed together under constant stirring to form a nitrate-surfactant mixture solution. The ratio of [CTAB/(Mg+Al)] in the mixture solution was maintained ~0.5. The mixture solution was hydrolyzed by the addition of aqueous ammonia until the pH reached ~11.6 which resulted in the precipitation of mixed metal hydroxide-surfactant matrix in the form of colloidal slurry. The slurry was rigorous stirred for 0.5 h and then sealed in an air-tight Pyrex glass bottle and subsequently aged hydrothermally at 90° C. for 5 days in conventional oven under autogenous pressure. After 5 day aging, the slurry was removed from the oven, cooled to room temperature and then filtered. The filtered precipitate was washed with warm deionized water in order to remove the unused surfactant. The precipitate was dried at 120° C. overnight and subsequently calcined at 650° C. for 3 h in ambient air environment.

(e) Preparation of $La_2O_3$—$Al_2O_3$ Support

In order to prepare 15 g of $La_2O_3$—$Al_2O_3$ support, 20.6 g of $La(NO_3)_3 \cdot 6H_2O$ and 53.4 g of $Al(NO_3)_3 \cdot 9H_2O$ salts were used. The corresponding metal nitrates were dissolved separately in deionized water and then mixed together to form a mixed nitrate solution. Separately 34.6 g of cetyltrimethyl ammonium bromide (CTAB) was dissolved in deionized warm water (60° C.) to form the surfactant solution. The mixed nitrate and surfactant solutions were mixed together under constant stirring to form a nitrate-surfactant mixture solution. The ratio of [CTAB/(La+Al)] in the mixture solution was maintained ~0.5. The mixture solution was hydrolyzed by the addition of aqueous ammonia until the pH reached ~11.6 which resulted in the precipitation of mixed metal hydroxide-surfactant matrix in the form of colloidal slurry. The slurry was rigorous stirred for 0.5 h and then sealed in an air-tight Pyrex glass bottle and subsequently aged hydrothermally at 90° C. for 5 days in conventional oven under autogenous pressure. After 5 day aging, the slurry was removed from the oven, cooled to room temperature and then filtered. The filtered precipitate was washed with warm deionized water in order to remove the unused surfactant. The precipitate was dried at 120° C. overnight and subsequently calcined at 650° C. for 3 h in ambient air environment.

(f) Preparation of $Y_2O_3$—$Al_2O_3$ Support

In order to prepare 15 g of $Y_2O_3$—$Al_2O_3$ support, 21.6 g of $Y(NO_3)_3 \cdot 6H_2O$ and 63.5 g of $Al(NO_3)_3 \cdot 9H_2O$ salts were used. The corresponding metal nitrates were dissolved separately in deionized water and then mixed together to form a mixed nitrate solution. Separately 20.6 g of cetyltrimethyl ammonium bromide (CTAB) was dissolved in deionized warm water (60° C.) to form the surfactant solution. The mixed nitrate and surfactant solutions were mixed together under constant stirring to form a nitrate-surfactant mixture solution. The ratio of [CTAB/(Y+Al)] in the mixture solution was maintained ~0.5. The mixture solution was hydrolyzed by the addition of aqueous ammonia until the pH reached ~11.6 which resulted in the precipitation of mixed metal hydroxide-surfactant matrix in the form of colloidal slurry. The slurry was rigorous stirred for 0.5 h and then sealed in an air-tight Pyrex glass bottle and subsequently aged hydrothermally at 90° C. for 5 days in conventional oven under autogenous pressure. After 5 day aging, the slurry was removed from the oven, cooled to room temperature and then filtered. The filtered precipitate was washed with warm deionized water in order to remove the unused surfactant. The precipitate was dried at 120° C. overnight and subsequently calcined at 650° C. for 3 h in ambient air environment.

EXAMPLE 2

Preparation of Sulfur Tolerant Ternary Oxide Supports

In the current study two ternary oxide supports were devised having a molar oxide ratio of 1:1:6 for $M^1{}_aO_b$:$ZrO_2$:$Al_2O_3$, where $M^1$ is chosen from Ca and Mg. The supports were prepared by the surfactant-assisted route using CTAB. The synthetic route employed in the study is based on a modification of a 'surfactant assisted route' by Idem et al. (2010) [22, 23], wherein nitrate salts of different metal ions were hydrolyzed together along with a surfactant (CTAB) under basic condition, and subsequently aged hydrothermally under autogenous pressure at 90° C. for 60 h. The molar ratio of CTAB/[$M^1$+Zr+Al] was ~0.5 (where $M^1$=Ca or Mg). It is notable that all the sulfur tolerant ternary oxide supports reported herein were prepared by analogous procedures to allow direct comparison of their catalytic properties.

EXAMPLE 3

Preparation of Monometallic and Bimetallic Sulfur Tolerant Catalysts

The sulfur tolerant single, binary and ternary oxide supports were impregnated with Ni precursor so as to result in the formation of monometallic catalysts. In order to investigate the effect of Cobalt on the Nickel-supported monometallic catalysts, a series of Ni—Co bimetallic catalysts were prepared by adapting a simultaneous, step-wise, and reverse step-wise wet-impregnation strategies. In the step-wise scheme, Co was impregnated after Ni (Ni→Co), in the reverse step-wise scheme Ni was impregnated after Co (Co→Ni), while in the simultaneous scheme both the metallic elements Ni and Co were impregnated together (Ni+Co). 0.1 M Ni(NO$_3$)$_2$.6H$_2$O and 0.1 M Co(NO$_3$)$_2$.4H$_2$O solutions were employed in the impregnation of Ni and Co species respectively. In the case of nickel-based monometallic catalysts, a nominal 5-20 wt % Ni was impregnated, while in the case of bimetallic catalysts a nominal 5-20 wt % Ni and 0.5-10 wt % Co was impregnated either simultaneously or sequentially. Finally all the impregnated samples were calcined at 650° C. for 3 h in ambient air environment. The various catalysts devised and evaluated in the current disclosure are listed in Table 1.

EXAMPLE 4

Catalyst Characterization Techniques (a) Surface Area and Pore Size Distribution Analysis The BET surface area (SA), pore volume (PV) and average pore diameter (PD) analyses for all catalysts were obtained by N$_2$ physisorption at liquid N$_2$ temperature using a Micromeritics ASAP 2010 apparatus. Prior to analysis, all the samples were degassed overnight at 180° C. under vacuum. Average pore diameter and average pore volume were analyzed using the desorption branch of the N$_2$-isotherm. Each sample was analyzed by N$_2$ physisorption at least twice in order to establish repeatability. The error in these measurements was ≤1%.

(b) Metallic Surface Area and Metal Dispersion Measurements

The metallic surface area and metal dispersion in the catalyst samples were estimated by hydrogen chemisorption at 35° C. using a Micromeritics ASAP 2010C instrument. Prior to analyses, the catalyst samples were dried at 120° C., and then reduced in situ in flowing H$_2$ gas (UHP grade) at 700° C. for 3 h (in order to mimic the reduced state formed during the course of a typical catalytic run) followed by evacuation at 700° C. for 1 h before cooling down to 35° C. The H/Ni and H/Co titration stoichiometry factors equal 1 were considered. The reduced metallic surface areas were estimated assuming a cross-sectional area of 0.0649 nm$^2$ and 0.0662 nm$^2$ for Ni and Co atoms respectively and the average cross-sectional area for the bimetallics (Co+Ni; Ni→Co; Co→Ni) was calculated to be 0.0652 nm$^2$ [29, 30]. The nickel dispersion (D %) was then calculated as the percentage of surface metal atoms with respect to total metal atoms in the catalysts [29, 30]. The H$_2$ chemisorption analysis was repeated for a few of the samples in order to check reproducibility. The error in these measurements was <5%.

(c) TPR Measurements

H$_2$-TPR of various catalyst samples was performed on a Quantachrome ChemBET 3000 unit equipped with a thermal conductivity detector (TCD). For all the samples (except pristine NiO) investigated by TPR, exactly same amount was analyzed, so as to make comparison possible. Prior to TPR measurements, the samples were degassed at 180° C. in an inert atmosphere (N$_2$ UHP grade) for 2 h. The reducibility of the supports as well as that of catalysts prepared in the current study, were studied by TPR technique in the temperature range from ambient to 1050° C. at a heating rate of 15° C./min, using 5% H$_2$/bal.N$_2$ as the reactive gas (flow rate=45 sccm). The total reactive gas consumed during TPR analysis was measured. For reference purposes, TPR profiles of pristine NiO and other single oxides were also studied. A few samples were analyzed by TPR at least twice in order to establish reproducibility. The error in T$_{max}$ values was found less than ±4° C.

(d) Inductively Coupled Plasma Mass Spectrometry (ICP-MS)

The trace metal analysis on the various catalysts was performed using an inductively coupled plasma mass spectrometry (ICP-MS, Varian 800 MS). A mass of 1.5-3.5 mg of finely ground catalyst powders were digested with 2 mL portions of Ultrex II ultrapure concentrated nitric acid (JT Baker, Phillipsburg, N.J., USA), 1 mL of 30% aqueous solution of hydrogen peroxide (Fisher Scientific, Fair Lawn, N.J., USA), and a second 2 mL portion of concentrated nitric acid with heating at each step. The final volume was reduced with heating to 0.1-1.0 mL. The digestate, which contained no solids, was made to a final volume of 50 mL with 1% ultrapure nitric acid. Subsequent dilutions in 1% ultrapure nitric acid with addition of internal standard were made to obtain samples within the linear calibration range. Analyses were determined using $^{60}$Ni, and $^{59}$Co isotopes, and $^{45}$Sc was used as the internal standard at 2 ppb in all samples and standards. The linear calibration range of the isotopes (r$^2$>0.99) were 1-32 ppb for Co, and 1-180 ppb for Ni. ICP/MS Calibration standards of individual or mixed elements (10 μg mL$^{-1}$) were obtained from Inorganic Ventures, Inc. (Kingstown, R.I., USA). These isotopes were shown previously to be free of interferences, and all reagent blank samples showed no detectable levels of the elements analyzed. Some of the catalyst samples were analyzed thrice with repeated digestion and ICP/MS analysis procedures. The ICP-MS results are presented in weight fraction (mass metal (g)/mass sample (g)).

(e) Activity Evaluation

Figure 2:
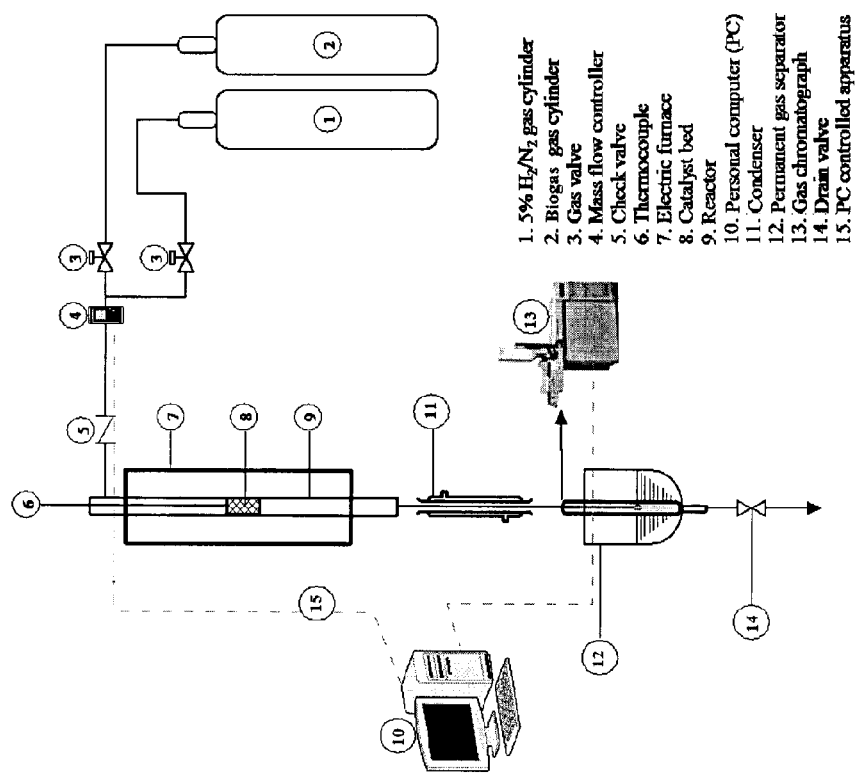
FIG. 2: schematic diagram of the experimental setup for the biogas reforming using packed bed tubular reactor (PBTR) in one embodiment of the application.
Figure 3A:
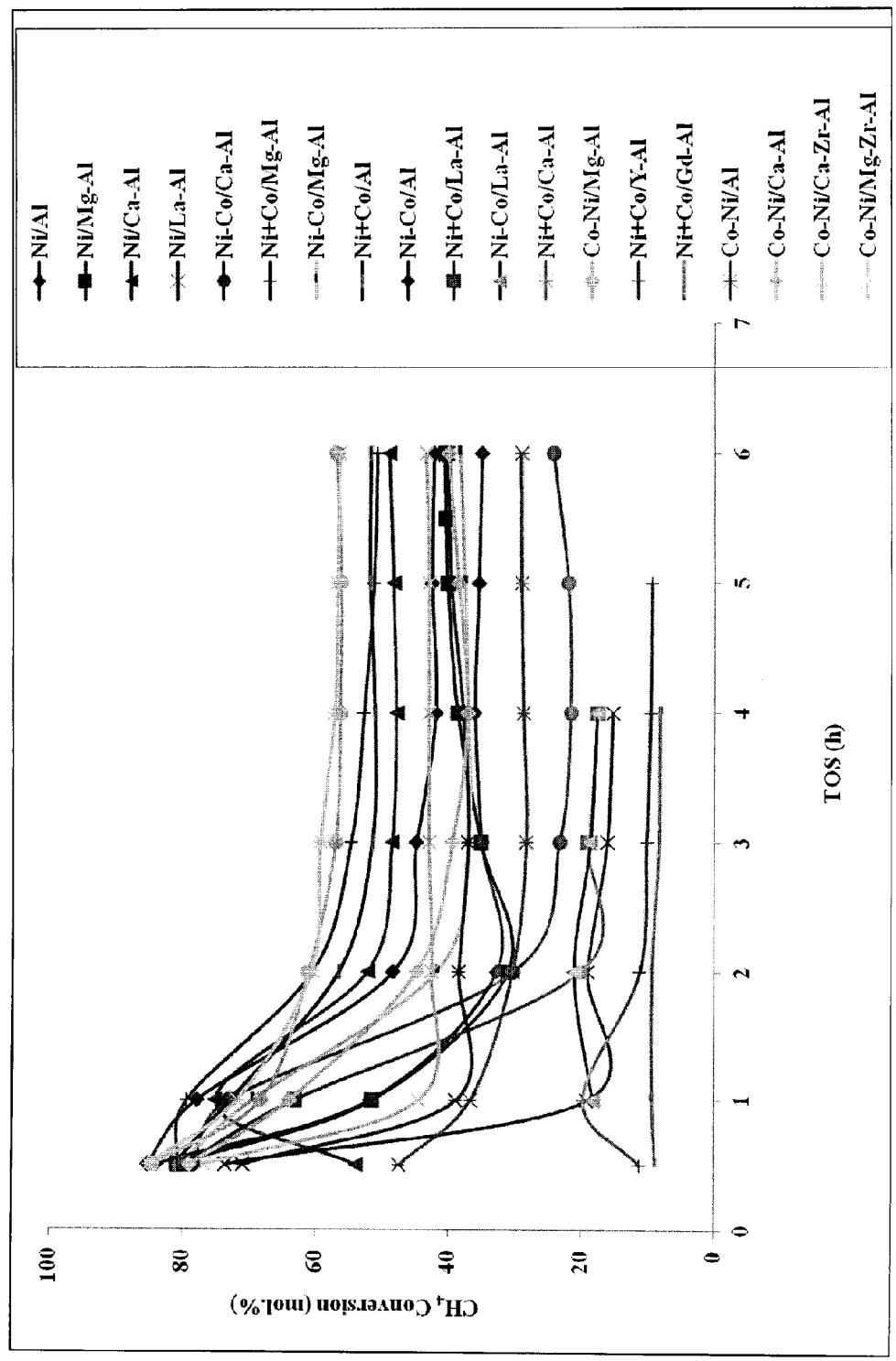
FIGS. 3A-3D: graphs showing the activity of exemplary monometallic and bimetallic catalysts of the application for $CO_2$ reforming of biogas (CTAB/Metal=0.5) at 900° C. 3A: $CH_4$ conversion (mol %); 3B: $H_2$ selectivity (mol %); 3C: $CO_2$ conversion (mol %); 3D: $H_2$ yield (mol %)—all as a function of TOS (hours) [Feed Composition: $CH_4/CO_2/N_2$=50/40/10 vol. %+100 ppmv $H_2S$; Feed flow rate=100 sccm; $W/F_{CH4}$=1.19 g·cat·h/mol. $CH_4$].
Figure 3B:
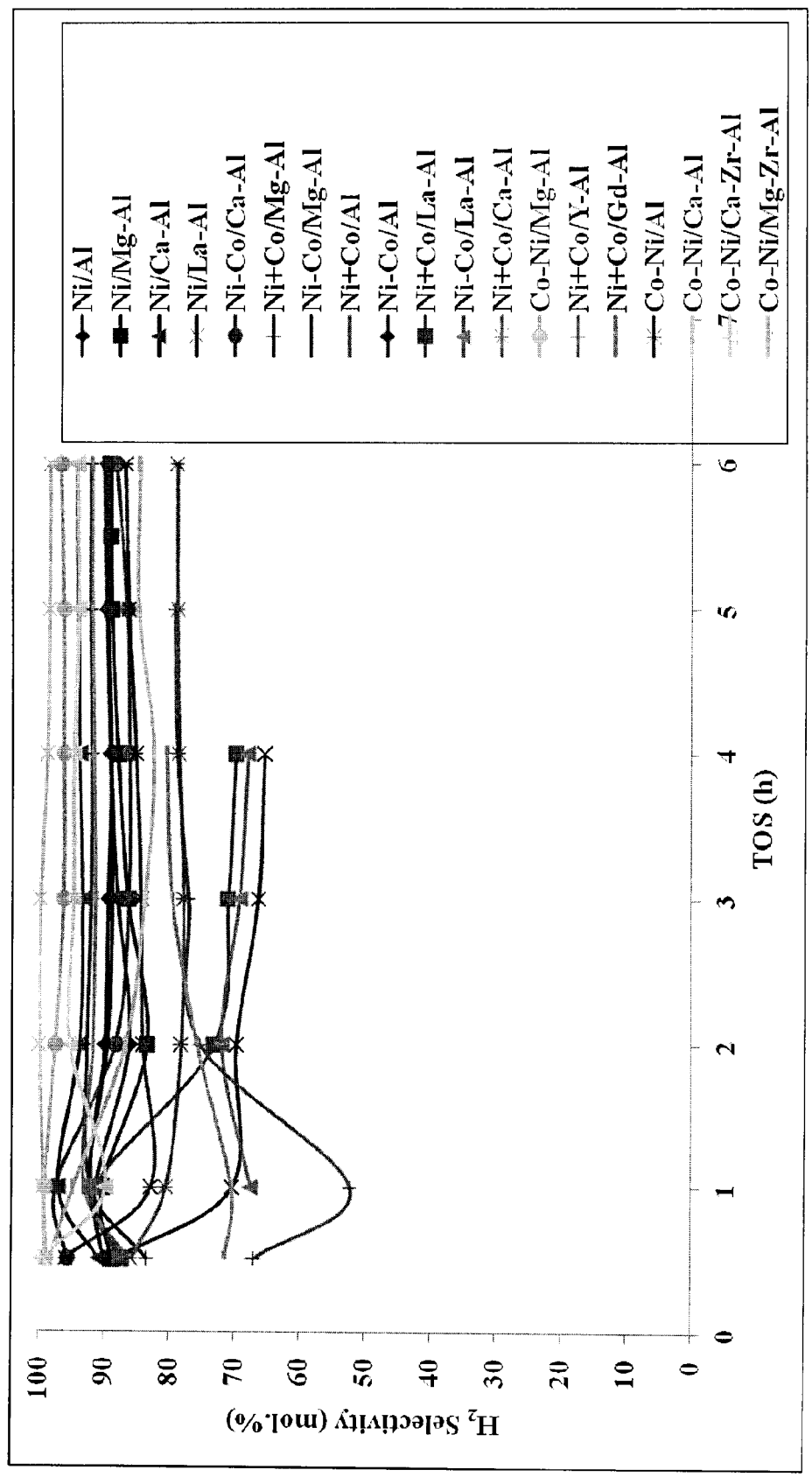
Figure 3C:
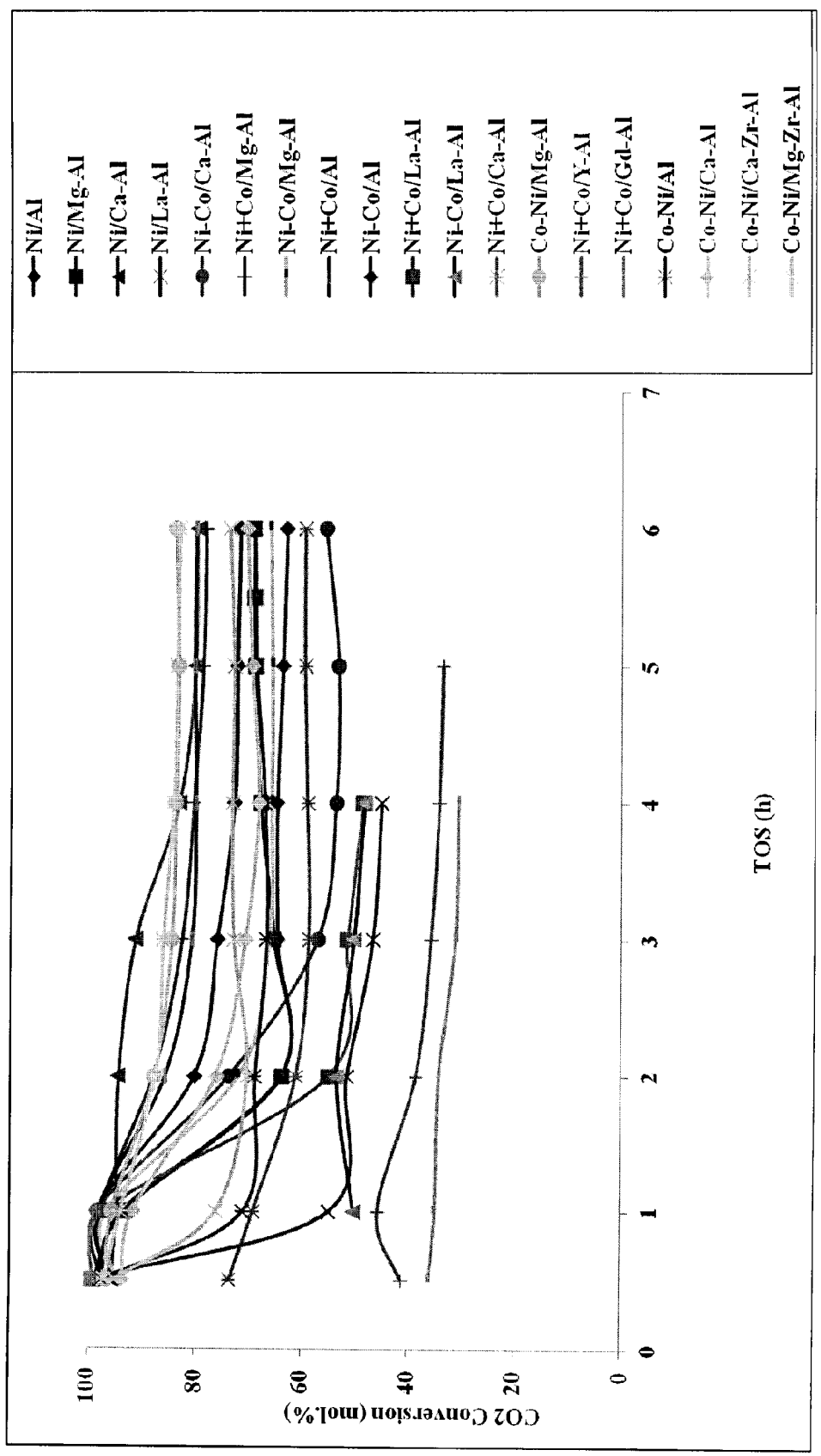
Figure 3D:
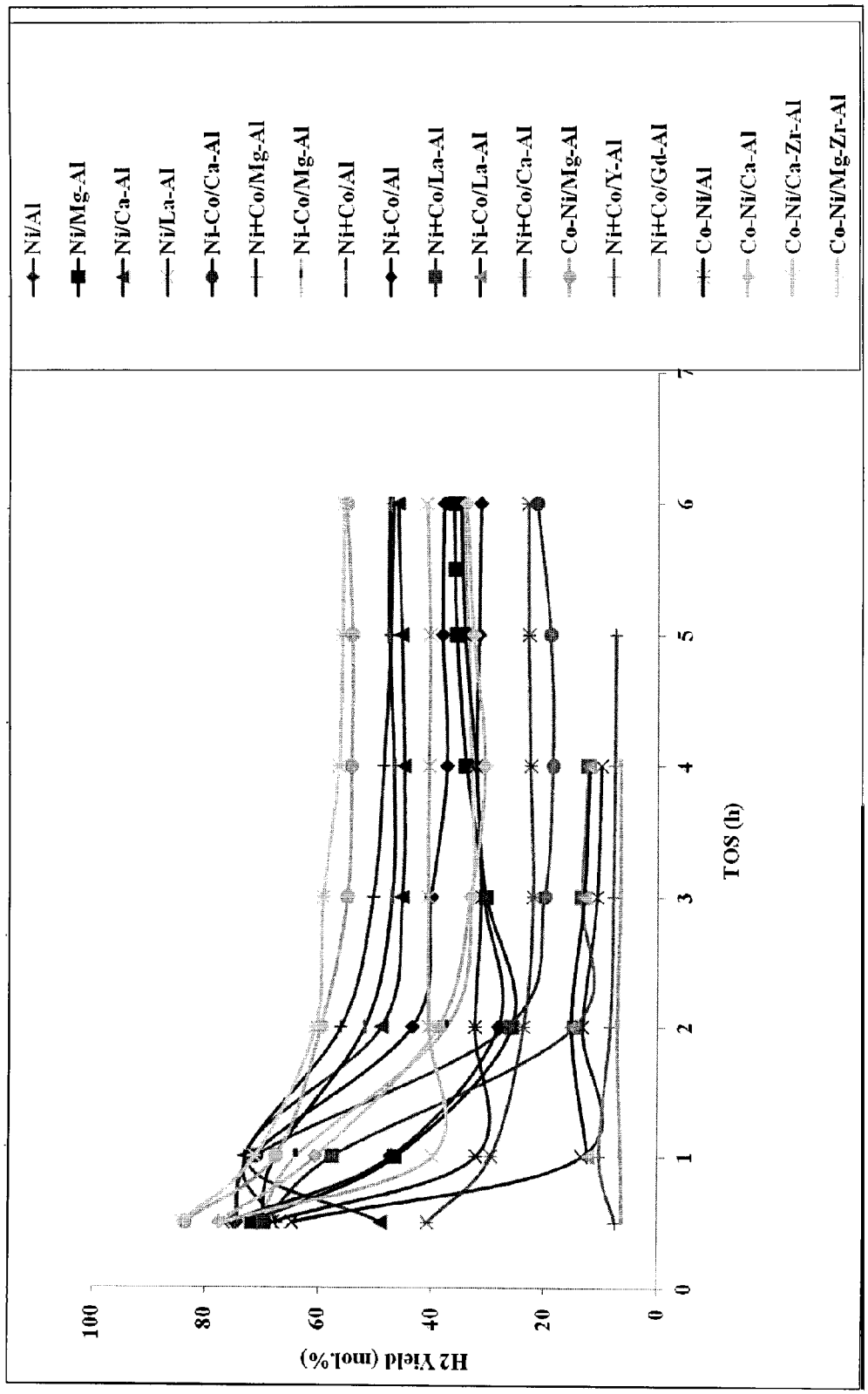

Activity evaluation studies were carried out in a packed bed tubular reactor (PBTR) (½" I.D.) made of Inconel 625. The reactor was placed vertically inside a programmable tubular furnace (Zesta Engineering), which was heated electrically. All the gases were regulated through precalibrated mass (gas) flow controllers with a digital readout unit (Aalborg Instruments) and constant gas flow of 100 sccm was maintained during the course of whole experiment. The schematic of the experimental setup is shown in FIG. 2. In a typical experiment 160 mg of 0.3 mm sized catalyst particles were mixed with 17.65 g of 0.3 mm sized quartz sand to form a bed of ~8.8 cm height. The catalyst bed temperature was measured by means of a sliding thermocouple dipped inside the catalyst bed. Prior to each run, the catalyst was activated in situ by reducing it at 700° C. for 3 h using a gas mixture of 5 vol. % H$_2$ in N$_2$ (flow rate=100 sccm). The selection of reduction temperature was based on the maximum T$_{max}$ obtained for Ni from TPR experiments. The pre-mixed biogas composed of CH$_4$:CO$_2$: N$_2$ in 50:40:10 vol % with 100 ppmv H$_2$S, was fed at a constant feed rate of 100 sccm. In another set of experiments the biogas of composition 40:40:20 vol % containing 100 ppmv H$_2$S was employed. The N$_2$ gas in the feed was used as an internal standard for mass balance measurements. The activity evaluation tests were performed at two different temperatures, namely 800 and 900° C. In order to approach plug flow conditions and minimize back mixing and channeling, certain operating criteria as prescribed in the literature was used [31]. Accordingly, the ratio of catalyst bed height to catalyst particle size (L/Dp) was 293, and the ratio of the internal diameter of the reactor to particle size (D/Dp) was 42. The product reformate stream coming from the reactor was passed through a series of heat exchangers and ice cooled knockout trap to condense water, after which the product gases were analyzed with an online GC/TCD (Agilent 6890 N) equipped with Hayesep Q and Molecular Sieve A columns. Some tests were repeated in order to check for reproducibility. The maximum errors for both conversion and selectivity were <1%.

Equations Used for Calculating Conversion, Selectivity and Yield:

The typical $CO_2$ reforming of biogas is an endothermic reaction in which $CH_4$ reacts with $CO_2$ to produce CO and $H_2$ (syngas). The $CO_2$ reforming reaction is also known as dry reforming reaction.

$$CH_4 + CO_2 \Leftrightarrow 2CO + 2H_2 \quad \Delta H_0 = +246 \text{ KJ/mol}$$

The formulae used for calculating $CH_4$ and $CO_2$ conversion, $H_2$ yield and selectivity are shown below.

$$CH_4 \text{ conversation}(\%) = \frac{(\text{Molar FLow of } CH_4)_{in} - (\text{Molar FLow of } CH_4)_{out}}{(\text{Molar FLow of } CH_4)_{in}} \times 100$$

$$H_2 \text{ Selectivity}(\%) = \frac{(\text{Molar FLow of } H_2)_{out}}{2[(\text{Molar FLow of } CH_4)_{in} - (\text{Molar FLow of } CH_4)_{out}]} \times 100$$

$$CO_2 \text{ Conversation}(\%) = \frac{(\text{Molar FLow of } CO_2)_{in} - (\text{Molar FLow of } Co_2)_{out}}{(\text{Molar FLow of } CO_2)_{in}} \times 100$$

$$H_2 \text{ Yeild}(\%) = \frac{(\text{Molar FLow of } H_2)_{out}}{2(\text{Molar FLow of } CH_4)_{in}} \times 100$$

(f) Results and Discussion

Characterization

The textural characteristics of the supports and catalysts devised in the current work are presented in Table 2. As noted from Table 2. It is evident that the $Al_2O_3$ support and its corresponding catalysts exhibit highest surface area among all the single and binary oxide samples tested in each category of the current study. The samples associated with $La_2O_3$—$Al_2O_3$ exhibit the lowest surface area measurements among all the other samples in all the categories. Upon impregnation of the supports, with the active species, a loss in the surface area was noted, as shown in Table 2. This is a general phenomenon observed in the case of supported catalysts when an active component is impregnated over its surface and into its pores. The observed decrease is mainly due to penetration of the dispersed nickel oxide into the pores of the support, thereby narrowing its pore diameter and blocking some of the pores. The relative measure of the surface area loss was significant in the case of bi-metallic impregnation compared to that of the mono-metallic impregnation. Among the bimetallic counterparts, step-wise impregnation route results in greater loss in surface area, compared to the simultaneous route. Additionally a variation in the surfactant/metal molar ratio employed during the course of support preparation, resulted in the variation of the observed textural characteristics. Evidently, the textural characteristics improved upon increasing the surfactant/metal molar ratio from 0.5 to 1.25 as noted in the case of CaO—$Al_2O_3$ based samples (Table 2.). Interestingly a significant increase in surface areas were noted upon incorporation of zirconia ($ZrO_2$) into the binary oxide supports, these results provide evidence that zirconia is an effective surface area stabilizer.

A $H_2$ chemisorption technique was employed to estimate the metallic surface area and metal dispersion of the active components (nickel and cobalt), which are given in Table 3. The catalyst formulations were prepared using a standard wet impregnation method and were loaded with 15 wt. % Ni in monometallic catalysts formulations, and in case of bimetallic catalysts, 15 wt. % Ni with 5 wt. % Co were used. During a chemisorption experiment, the sample was dried, reduced in hydrogen, evacuated, then cooled to the analysis temperature (35° C.), and finally evacuated before performing actual measurements. In a volumetric $H_2$ chemisorption measurement, known amounts of hydrogen were dosed and subsequently adsorbed at different partial pressures, resulting in a chemisorption isotherm. This isothermal measurement was repeated after applying an evacuation step at the analysis temperature in order to remove weakly adsorbed species (back-sorption or a dual isotherm method). The difference between the two isotherms represents the chemically bonded reactive gas and was used to calculate the active metal surface area. This information is combined with information on metal loading (obtained from ICP/MS analysis—Table 4.) to calculate the metal dispersion. The relative measurement of chemically bound hydrogen was used to distinguish the monometallic and bimetallic catalyst formulations investigated in the current study (Table 3.). The nickel surface area in the case of 15Ni/$La_2O_3$—$Al_2O_3$ was found to be lower than that observed in any of the mono-metallic catalysts. In the case of monometallic catalysts, the descending order of Ni dispersion was found to be 15Ni/Ca—O—$Al_2O_3$>15Ni/MgO—$Al_2O_3$>15Ni/$Al_2O_3$>15Ni/$La_2O_3$—$Al_2O_3$. Similar trends were observed in the case of bimetallic catalysts prepared by simultaneous impregnation. However in the case of reverse stepwise impregnated bimetallic catalysts the trends of metal dispersion were 5Co→15Ni/$Al_2O_3$>5Co→15Ni/Ca—O—$Al_2O_3$>5Co→15Ni/MgO—$Al_2O_3$. Additionally it was noted that upon the addition of $ZrO_2$ to CaO—$Al_2O_3$ and MgO—$Al_2O_3$ supports, the metal dispersion deteriorated. From the above findings, it can be inferred that catalysts that possess active species (Ni) in a highly dispersed state are favorable catalysts for the current application.

The metal composition of the catalysts was analyzed using inductively coupled plasma mass spectrometry (ICP/MS) technique. The results obtained in terms of weight fraction are given in Table 4. Trace analysis was performed primarily to detect the amount(s) of metal(s) present in each catalyst formulation.

Activity Tests

All the monometallic and bimetallic catalysts developed in the current study were tested for $CO_2$ reforming of biogas at 900° C., using a premixed biogas feed of composition $CH_4$:$CO_2$:$N_2$ in 50:40:10 vol % with 100 ppmv $H_2S$ which was fed at a constant feed rate of 100 sccm. The results obtained are presented in FIGS. 3A-3D. A comparative analysis of the results reveals that among the nineteen catalysts tested, fourteen formulations exhibited favorable results. The activity and selectivity of the favorable catalysts are listed and compared in Table 5. Among the fourteen favorable catalyst formulations, 15Ni/Ca—O—$Al_2O_3$, 15Ni+5Co/MgO—$Al_2O_3$ (simultaneous), 15Ni+5Co/$Al_2O_3$ (simultaneous), 5Co-15Ni/MgO—$ZrO_2$—$Al_2O_3$ (reverse step-wise) and 5Co-15Ni/MgO—$Al_2O_3$ (reverse step-wise) exhibit highest $CH_4$ conversions 49.0%, 50.8%, 51.7%, 56.5%, 57.1% respectively.

Based on FIGS. 3A-3D and Table 5, it can be inferred that all the catalyst formulations that used $La_2O_3$—$Al_2O_3$, $Y_2O_3$—$Al_2O_3$, and $Gd_2O_3$—$Al_2O_3$ as supports are not suitable for the current application. The relatively high affinity of $La_2O_3$ towards $H_2S$ is the reason for the observed results. In a recent study by Gallego et al. [13], it was proved that the catalytic activity of the $La_2O_3$ support is very susceptible to $H_2S$ poisoning, which is one of the contaminants in biogas as well as many of the natural gas fields. Lanthanum oxysulfide ($La_2O_2S$) is the sulfidation product of $La_2O_3$ ($La_2O_3$+$H_2S$=$La_2O_2S$+$H_2O$) [13]. Using XRD, Gallego et al. [13] confirmed the presence of lanthanum oxysulfides in the sulfided catalyst, however it was also noted, during the reforming reaction, methane present in the feed gas promotes the formation of the lanthanum sulfides (LaS and $LaS_2$) [13]. Additionally the catalysts employing $La_2O_3$—$Al_2O_3$, $Gd_2O_3$—$Al_2O_3$ and $Y_2O_3$—$Al_2O_3$ supports did not fare well for the current application and therefore were not pursued any further.

Figure 4A:
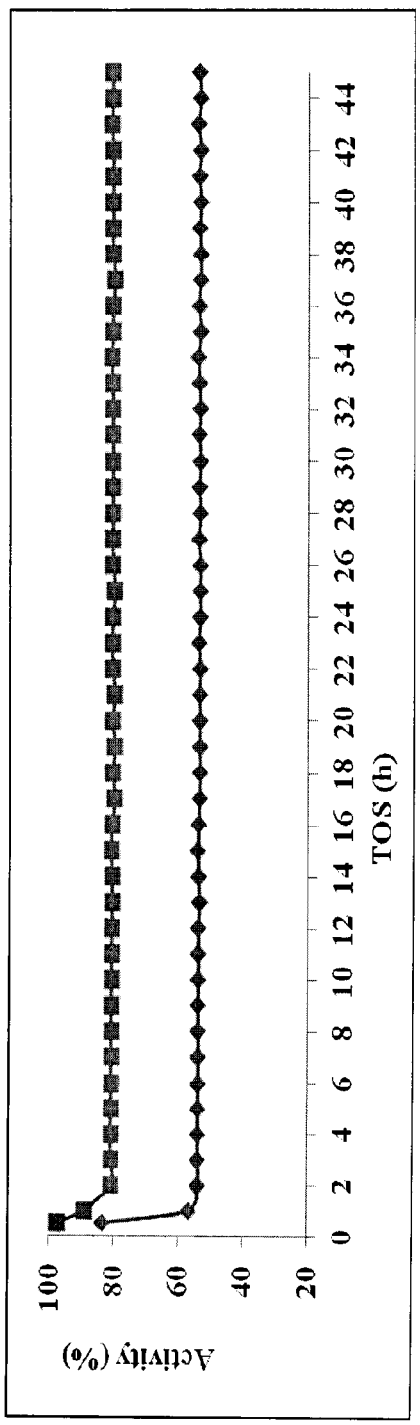
FIG. 4A: graph showing the results of a long term stability study of an exemplary catalyst of the application, 5Co→15Ni/MgO—$Al_2O_3$ (reverse step-wise) (CTAB/Metal=0.5), for $CO_2$ reforming of biogas, where C—$CH_4$=$CH_4$ conversion (mol %) and S—$H_2$=$H_2$ selectivity (mol %). [T=900° C.; Feed Composition: $CH_4/CO_2/N_2$=50/40/10 vol. %+100 ppmv $H_2S$; Feed flow rate=100 sccm; $W/F_{CH4}$=1.19 g·cat·h/mol. $CH_4$]

Both mono-metallic and bi-metallic (simultaneous & reverse stepwise) catalysts belonging to the family of $Al_2O_3$, CaO—$Al_2O_3$ and MgO—$Al_2O_3$ based supports were found to be suitable for the $CO_2$ reforming of biogas. The descending order of activity observed is given here: bi-metallic (reverse stepwise Co→Ni)>bi-metallic (simultaneous Ni+Co)>mono-metallic (Ni)>bi-metallic (stepwise Ni→Co). For $Al_2O_3$ and MgO—$Al_2O_3$ based catalysts, the results (FIGS. 3A-3D and Table 5) reveal that the addition of cobalt by simultaneous impregnation route, leads to improvement in the catalytic activity of Ni-based catalysts. For instance, the catalytic activity in terms of $CH_4$ conversion improves by ~10% for the 15Ni+5Co/$Al_2O_3$ (sim) and 15Ni+5Co/MgO—$Al_2O_3$ (sim) catalysts when compared to the 15Ni/$Al_2O_3$ and 15Ni/MgO—$Al_2O_3$ catalysts respectively. Bimetallic catalysts were found to be better than their monometallic counterparts, which, again while not wishing to be limited by theory, may be due to the improvement in the catalyst stability on account of Co addition, which acts as a sacrificial element. Interestingly reverse step-wise impregnation strategy was found to yield the best results among the various impregnation strategies employed in the current work. By reversing the order of impregnating species it was possible to improve the catalytic activity (in terms of $CH_4$ conversion) by ~20 mol. % for reverse step-wise impregnated 5Co→15Ni/MgO—$Al_2O_3$ catalyst as compared to its step-wise impregnated counterpart 15Ni→5Co/MgO—$Al_2O_3$. Among the nineteen so odd catalysts evaluated in the current work, 5Co→15Ni/MgO—$Al_2O_3$ delivered the best catalytic performance with ~57 mol. % $CH_4$ conversion and ~97 mol. % $H_2$ selectivity. Therefore it was chosen for testing for extended TOS operation for a limited period of 45 h, after which the reactor was intentionally shutdown, the results obtained thereof are shown in FIG. 4A.

Figure 4B:
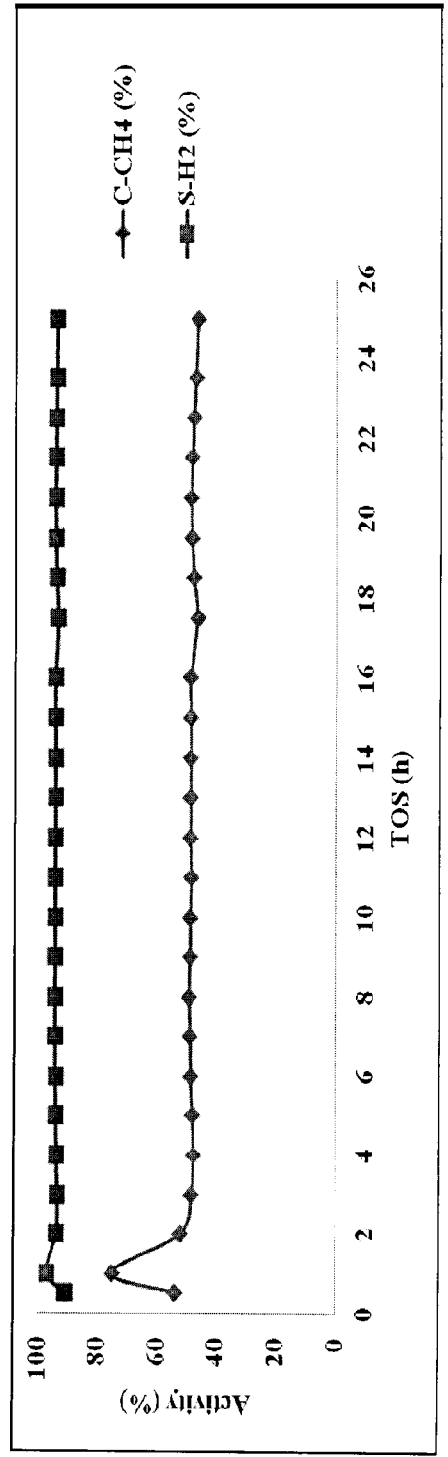
FIG. 4B: graph showing the long term stability study of an exemplary catalyst of the application, 15Ni/Ca—O—$Al_2O_3$ (CTAB/Metal=0.5), for $CO_2$ reforming of biogas where C—$CH_4$=$CH_4$ conversion (mol %) and S—$H_2$=$H_2$ selectivity (mol %). [T=900° C.; Feed Composition: $CH_4/CO_2/N_2$=50/40/10 vol. %+100 ppmv $H_2S$; Feed flow rate=100 sccm; $W/F_{CH4}$=1.19 g·cat·h/mol. $CH_4$].

In the case of catalysts based on CaO—$Al_2O_3$ support, the 15Ni/Ca—O—$Al_2O_3$ catalyst formulation was found to be favorable for the current application. The catalysts were then used for long term stability and other parametric studies with 15Ni/Ca—O—$Al_2O_3$ chosen as an example, based on comparative analysis of only the $H_2$ selectivities obtained. The various parametric studies performed over 15Ni/Ca—O—$Al_2O_3$ catalyst in order to investigate their role on the resultant catalytic activity are: (1) surfactant/metal ratio effect; (2) $CH_4$-to-$CO_2$ ratio effect; (3) $H_2S$ effect; (4) temperature effect and (5) cobalt effect. The long term stability of 15Ni/Ca—O—$Al_2O_3$ was evaluated by operating the catalyst for 25 h time on stream (ToS), the results obtained thereof are presented in FIG. 4B. The results reveal that 15Ni/Ca—O—$Al_2O_3$ delivered steady catalytic activity with average $CH_4$ conversion~47.6% and average $H_2$ selectivity~94.1%.

Effect of Surfactant/Metal Ratio

Figure 5A:
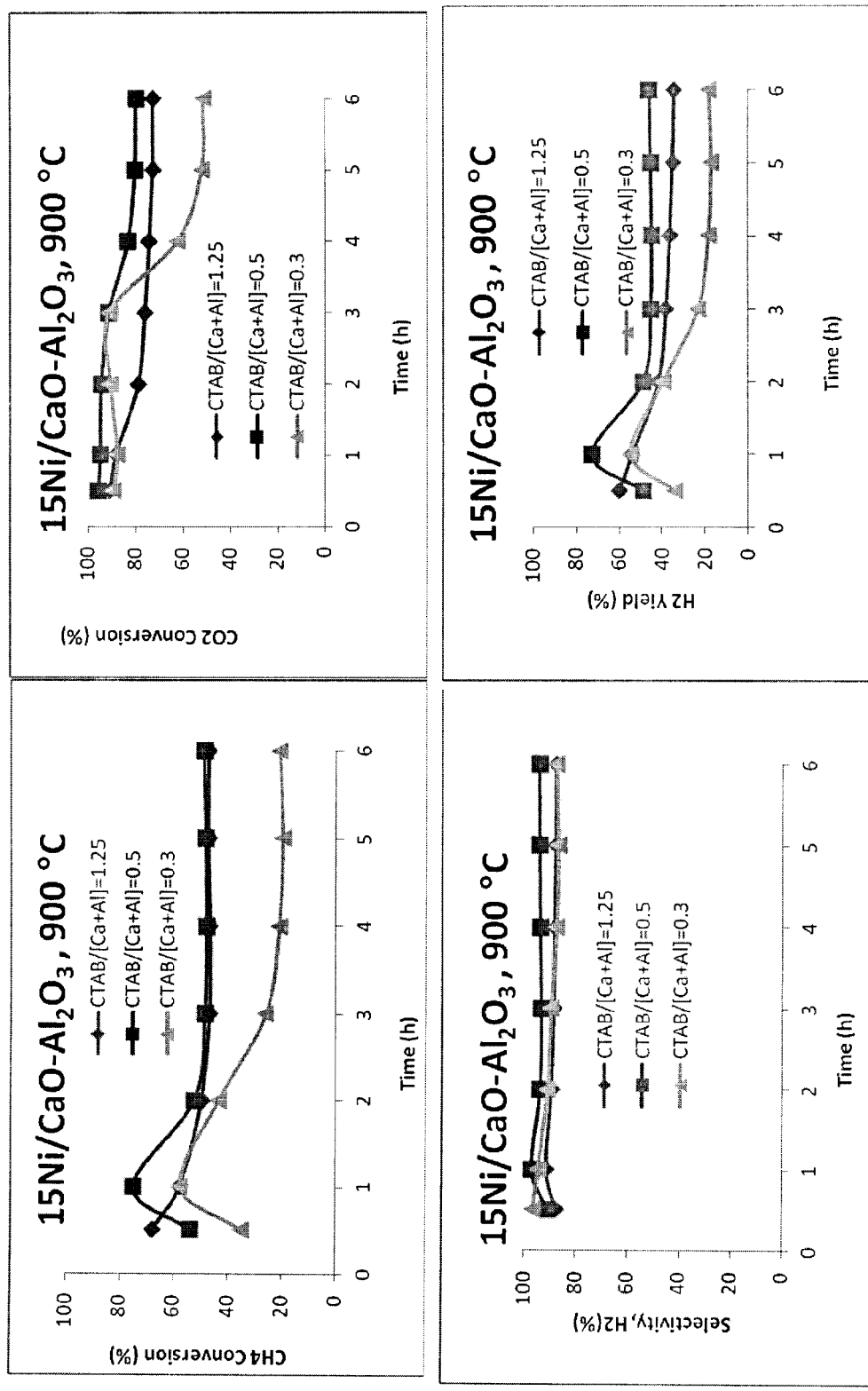
FIG. 5a: graphs showing the effect of surfactant/metal molar ratio on the catalytic activity of exemplary catalyst, 15Ni/Ca—O—$Al_2O_3$, for $CO_2$ reforming of biogas at 900° C. [T=900° C.; Feed Composition: $CH_4/CO_2/N_2$=50/40/10 vol. %+100 ppmv $H_2S$; Feed flow rate=100 sccm; $W/F_{CH4}$=1.19 g·cat·h/mol. $CH_4$].
Figure 5B:
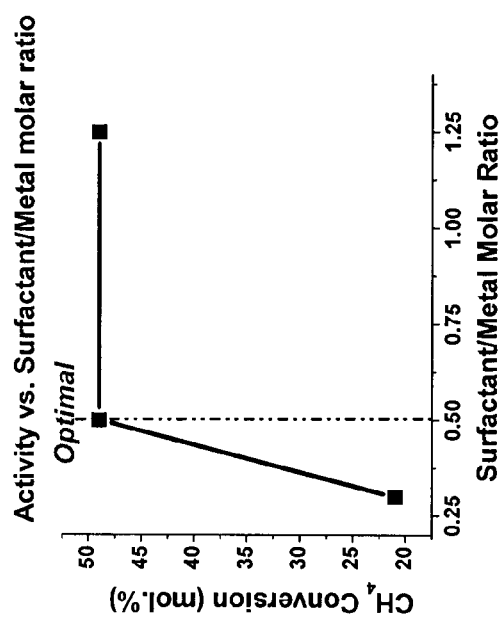
FIG. 5b: graph showing the influence of surfactant/metal molar ratio on the resultant activity for the exemplary catalyst, 15Ni/Ca—O—$Al_2O_3$.

In order to test the influence of surfactant/metal molar ratio on the catalytic performance of 15Ni/Ca—O—$Al_2O_3$ formulation, CaO—$Al_2O_3$ support was prepared by employing three different CTAB/metal molar ratios i.e., 1.25, 0.5 and 0.3. The three catalysts were compared under identical operating conditions and the results obtained thereof are presented in FIGS. 5a and 5b. Interestingly, there is no significant improvement or change in the catalytic activity between the catalysts whose supports were prepared with surfactant/metal molar ratio 0.5. However the catalyst whose support was prepared by employing surfactant/metal molar ratio 0.3, did not yield the same results as obtained with other catalysts. On the whole the performance (in terms of % $CH_4$ conversion) of catalyst prepared with surfactant/metal molar ratio=0.3 (<0.5) was 2.5 fold smaller. Thus, it is established that, for this process, the increase in the surfactant/metal molar ratio increases the resultant catalytic activity within a certain range (>0.5), beyond which there is no noticeable increase, as shown clearly in FIG. 5b. In the current study, surfactant/metal molar ratio=0.5 was found to be optimal to obtain high conversions. This relationship between the catalytic activity and surfactant/metal molar ratio is distinct from the one noted recently with the 5Ni/$Ce_{0.6}Zr_{0.4}O_2$ catalyst formulations. In the case of 5Ni/$Ce_{0.6}Zr_{0.4}O_2$ formulations, the role of surfactant/metal molar ratio on the ultimate catalytic activity was clearly that of improvement with increasing surfactant/metal molar ratio up to 1.25 in a monotonic manner [27]. From the current findings it is understood that for the $Al_2O_3$ and $M^1{}_aO_b$—$ZrO_2$—$Al_2O_3$ based formulations surfactant/metal 0.5 is sufficient to obtain a good working catalyst. At the same time, it also helped in the lowering the costs of catalyst preparation and chemical waste disposal. This is because the use of surfactant/metal=0.5 instead of 1.25 translates into cost reduction in terms of the surfactant usage and associated disposal expenses.

Effect of $CH_4$-to-$CO_2$ Ratio

Figure 6:
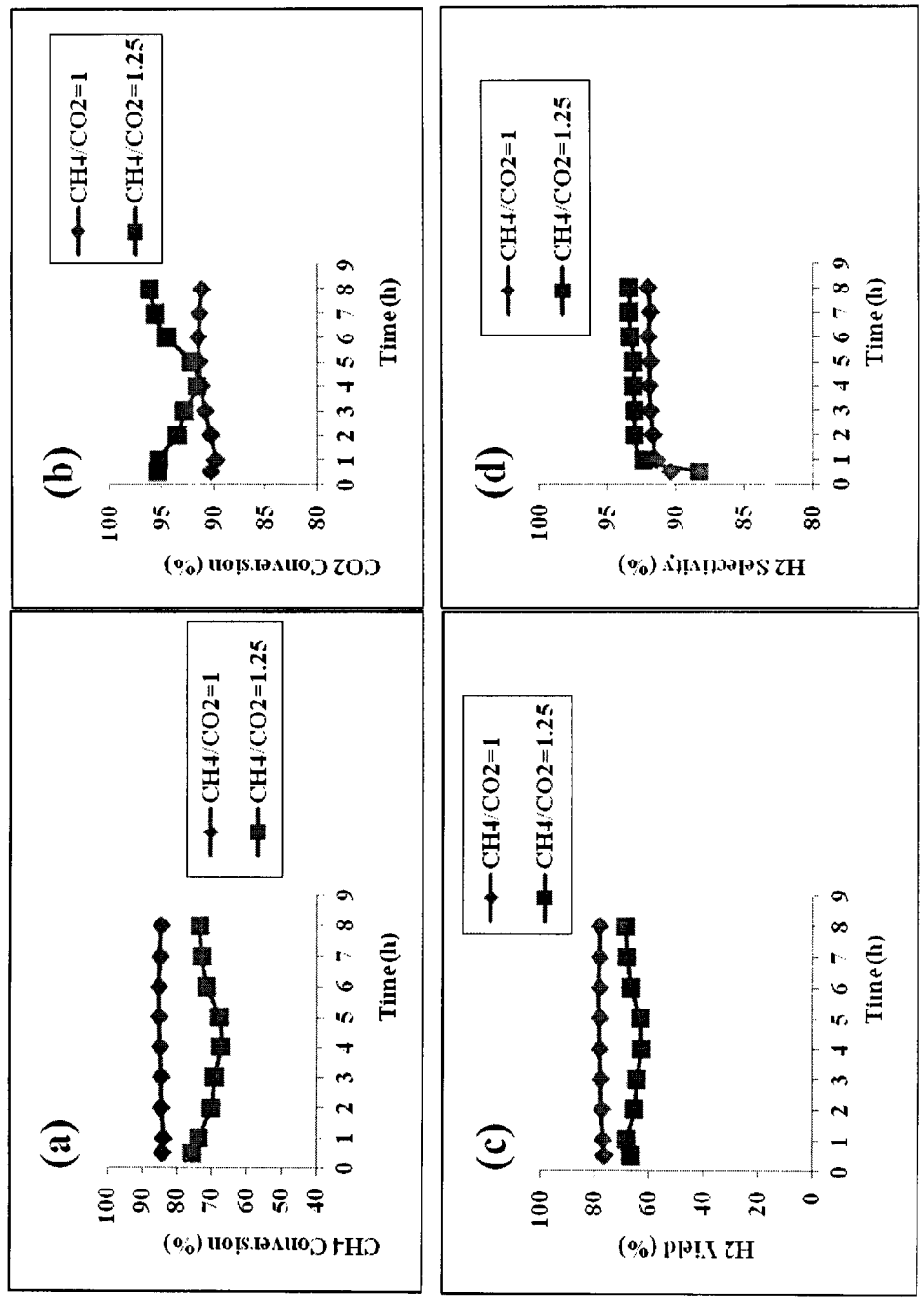
FIG. 6: graphs showing the effect of $CH_4/CO_2$ ratio on the catalytic activity of exemplary catalyst, 15Ni/Ca—O—$Al_2O_3$ (CTAB/Metal=0.5), for $CO_2$ reforming of biogas at 800° C. [T=800° C.; Feed Composition: $CH_4/CO_2/N_2$=50/40/10 vol. % and 40/40/20 vol. %; Feed flow rate=100 sccm; $W/F_{CH4}$=1.19 and 1.49 g·cat·h/mol. $CH_4$].
Figure 7:
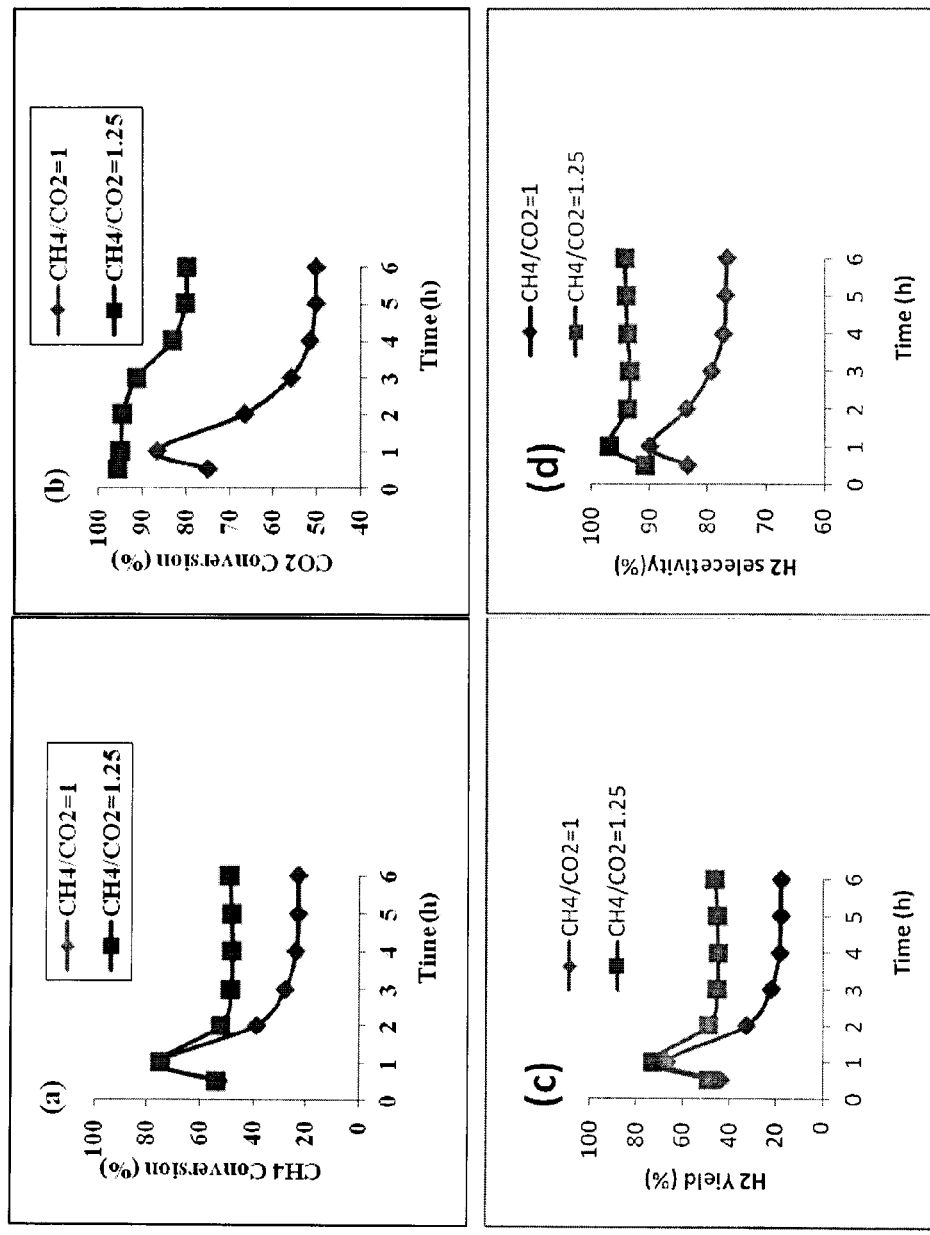
FIG. 7: graphs showing the effect of $CH_4/CO_2$ ratio on the catalytic activity of exemplary catalyst, 15Ni/Ca—O—$Al_2O_3$ (CTAB/Metal=0.5), for $CO_2$ reforming of biogas at 900° C. [T=900° C.; Feed Composition: $CH_4/CO_2/N_2$=50/40/10 vol. %+100 ppmv $H_2S$ and 40/40/20 vol. %+100 ppmv $H_2S$; Feed flow rate=100 sccm; $W/F_{CH4}$=1.19 and 1.49 g·cat·h/mol. $CH_4$].

The effect of $CH_4/CO_2$ ratio on the resultant catalytic activity was studied by varying the $CH_4/CO_2$ ratio from 1 to 1.25. The tests were performed using feeds without $H_2S$ and with 100 ppmv $H_2S$ at 800 and 900° C., respectively. The results are presented in FIGS. 6 and 7, respectively. The results reveal that the catalysts formulation 15Ni/Ca—O—$Al_2O_3$ (CTAB/Metal=0.5) is suitable for both methane-rich and/or lean feeds and is also suitable for feeds containing $H_2S$ and for the feeds that are free of $H_2S$. At 800° C. operating temperature, higher conversions were noted for the feed containing $CH_4/CO_2$=1 compared to the feed with $CH_4/CO_2$=1.25. However for the feeds containing 100 ppmv $H_2S$, the operational temperature had to be raised to 900° C. in order to compensate for the $H_2S$ poisoning effect. Additionally, at 900° C., higher conversions were noted for feed containing $CH_4/CO_2$=1.25 compared to the feed with $CH_4/CO_2$=1.

Effect of $H_2S$ Poisoning

Figure 8:
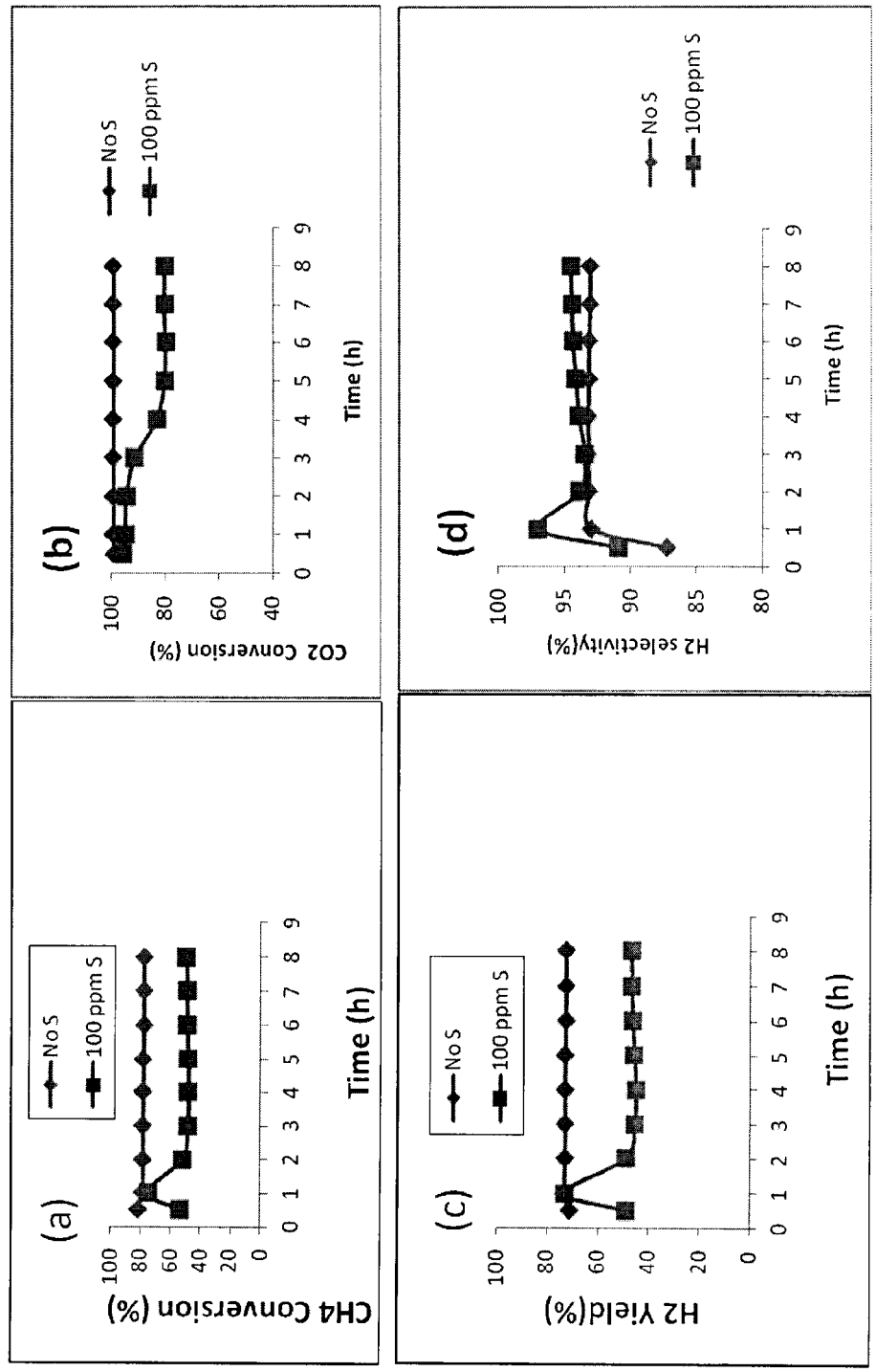
FIG. 8: graphs showing the effect of sulfur on the catalytic activity of exemplary catalyst, 15Ni/Ca—O—$Al_2O_3$ (CTAB/Metal=0.5), for $CO_2$ reforming of biogas at 900° C. [T=900° C.; Feed Composition: $CH_4/CO_2/N_2$=50/40/10 vol. % with & without 100 ppmv $H_2S$; Feed flow rate=100 sccm; $W/F_{CH4}$=1.19 g·cat·h/mol. $CH_4$].
Figure 9:
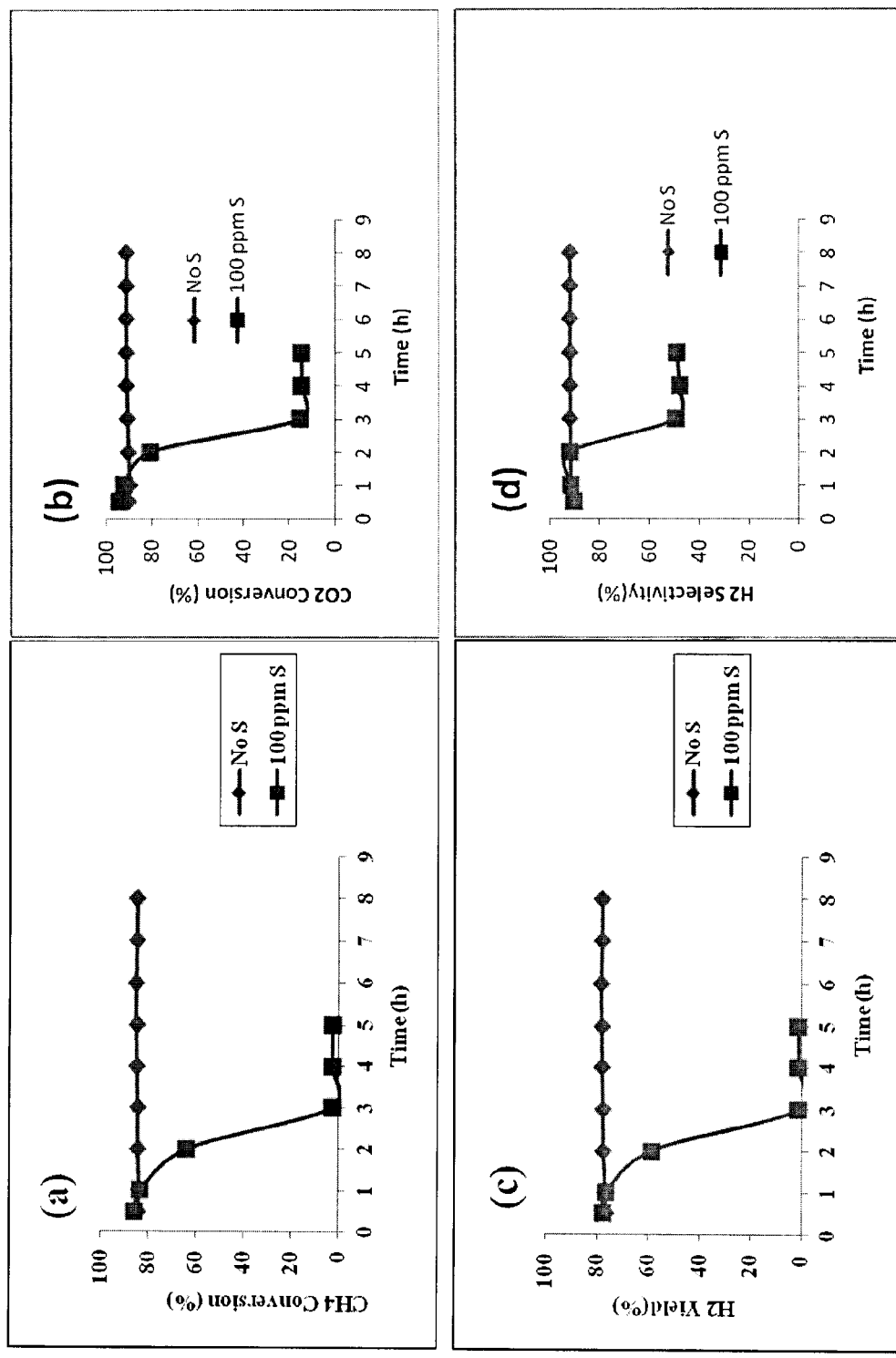
FIG. 9: graphs showing the effect of sulfur on the catalytic activity of exemplary catalyst, 15Ni/Ca—O—$Al_2O_3$ (CTAB/Metal=0.5), for $CO_2$ reforming of biogas at 800° C. [T=800° C.; Feed Composition: $CH_4/CO_2/N_2$=40/40/20 vol. % with & without 100 ppmv $H_2S$; Feed flow rate=100 sccm; $W/F_{CH4}$=1.49 g·cat·h/mol. $CH_4$].

The effect of $H_2S$ on the resultant catalytic activity was studied by using feed free of $H_2S$ and feed containing 100 ppmv $H_2S$. The tests were performed using feeds with $CH_4/CO_2$=1.25 and $CH_4/CO_2$=1 at 900 and 800° C., respectively. The results are presented in FIGS. 8 and 9, respectively. The results reveal that the catalysts formulation 15Ni/Ca—O—$Al_2O_3$ (CTAB/Metal=0.5) is suitable for feeds containing $H_2S$ and for the feeds that are free of $H_2S$ and is also suitable for both methane-rich and/or lean feeds. However, it is not suitable for feed containing $H_2S$ at 800° C. In order to compensate for the $H_2S$ poisoning effect the operational temperature has to be increased to 900° C. At 900° C. reaction temperature, higher conversions were obtained for the feed ($CH_4/CO_2$=1.25) free of $H_2S$ (78.0 mol. %) compared to the feed ($CH_4/CO_2$=1.25) with 100 ppmv $H_2S$ (50.0 mol. %). At 800° C. operating temperature, 78.0 mol. % conversion was noted for the feed ($CH_4/CO_2$=1) free of $H_2S$ (78.0 mol. %); however, no conversion was observed for the feed ($CH_4/CO_2$=1) containing 100 ppmv $H_2S$.

Effect of Temperature

Figure 10:
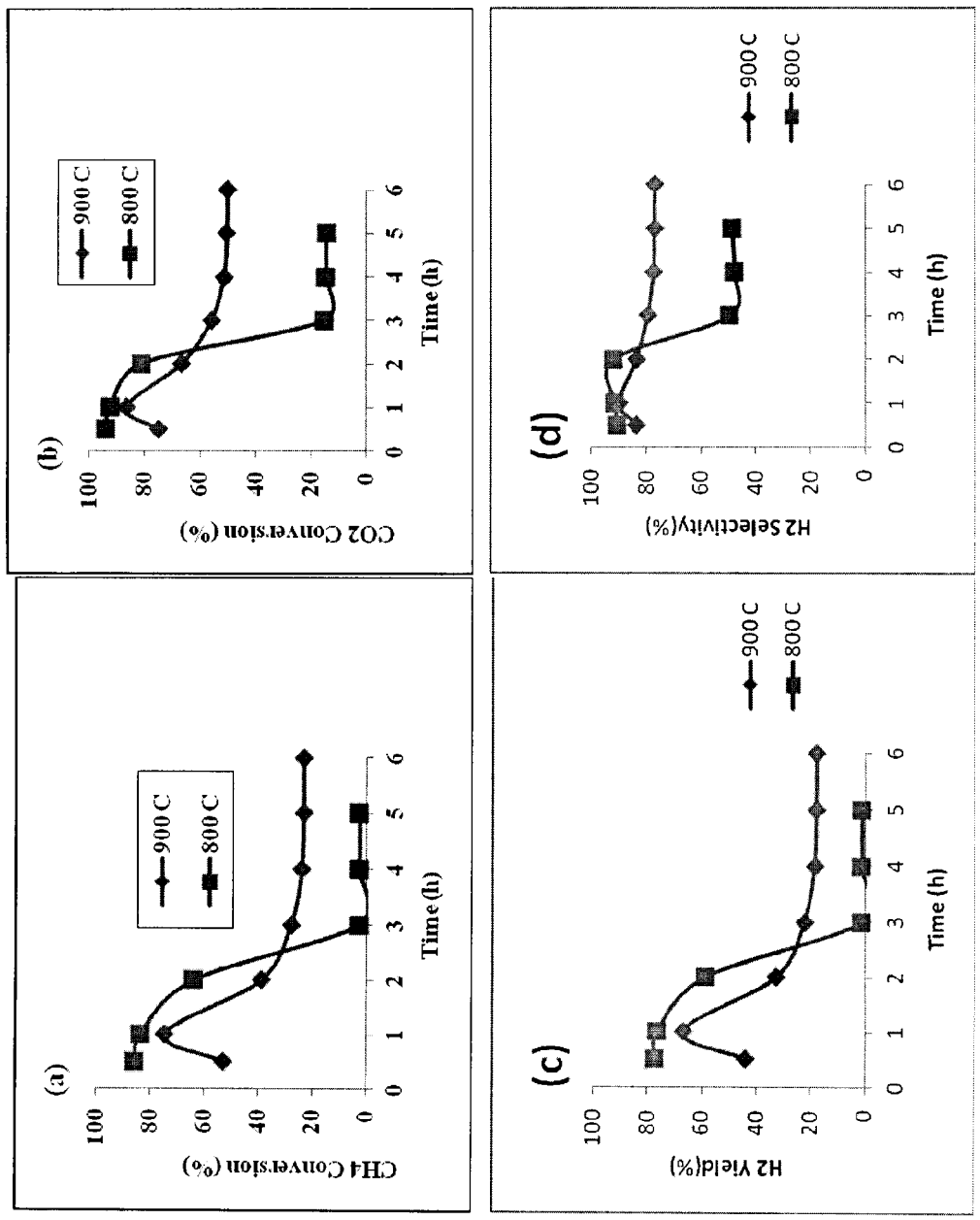
FIG. 10: graphs showing the effect of temperature on the catalytic activity of exemplary catalyst, 15Ni/Ca—O—$Al_2O_3$ (CTAB/Metal=0.5), for $CO_2$ reforming of biogas. [T=800 & 900° C.; Feed Composition: $CH_4/CO_2/N_2$=40/40/20 vol. % with 100 ppmv $H_2S$; Feed flow rate=100 sccm; $W/F_{CH4}$=1.49 g·cat·h/mol. $CH_4$].

The effect of temperature was studied by varying the operating temperature viz., 800° C. and 900° C. using a feed of $CH_4/CO_2$=1 containing 100 ppmv $H_2S$. The corresponding results are presented in FIG. 10. As noted from FIG. 10, at 800° C. the 15Ni/Ca—O—Al$_2$O$_3$ (CTAB/Metal=0.5) catalyst experiences severe H$_2$S poisoning leading to rapid deactivation of the catalysts. However, when the temperature is increased to 900° C., the H$_2$S poisoning effect is partially compensated, thereby leading to the observance of reasonable catalytic activity (~23 mol. % CH$_4$ conversion) with considerable stability.

Effect of Cobalt Addition

Figure 11:
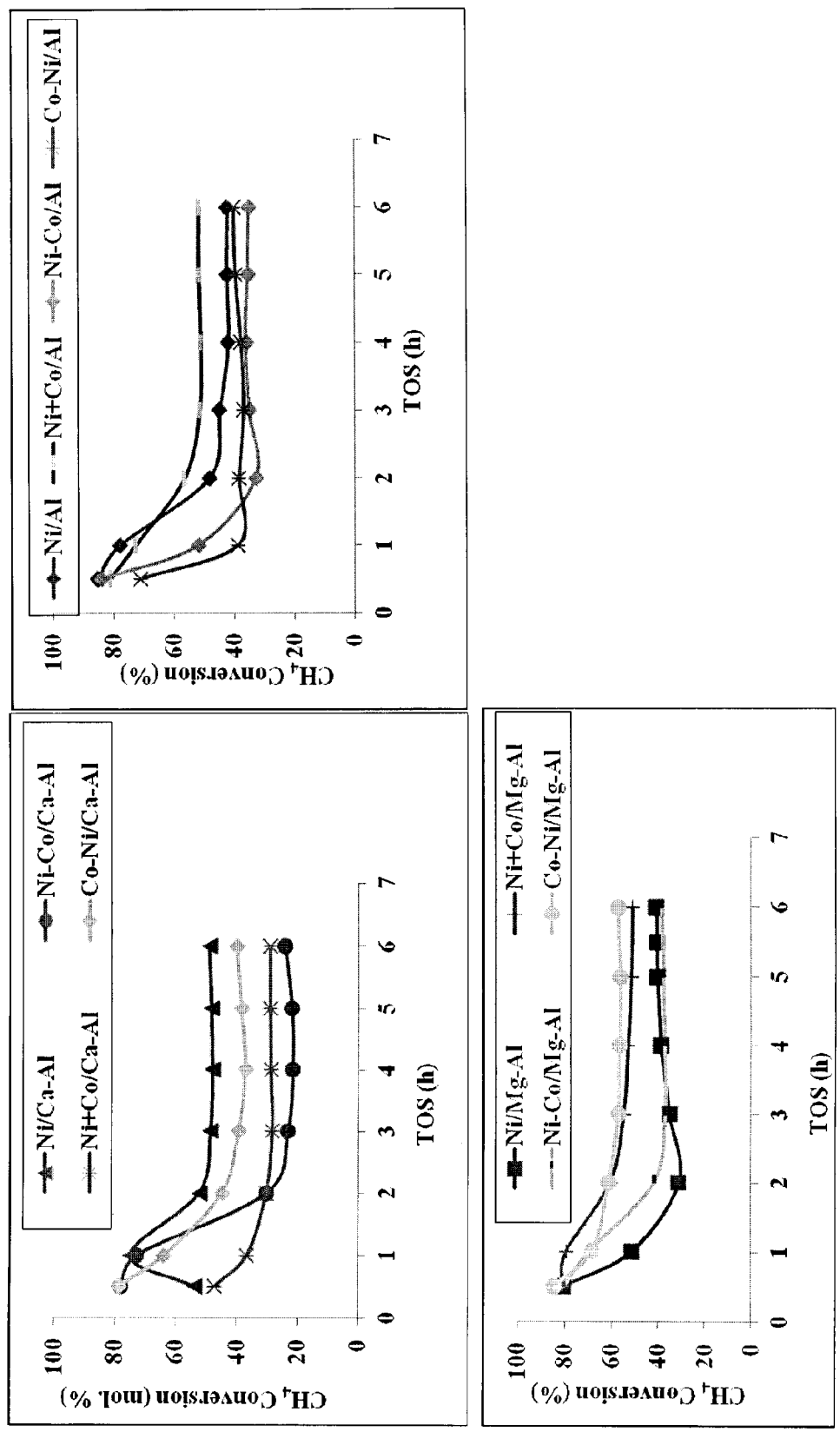
FIG. 11: graphs showing the effect of cobalt addition and sequence of addition on the resultant catalytic activity of exemplary catalysts of the application.
Figure 12:
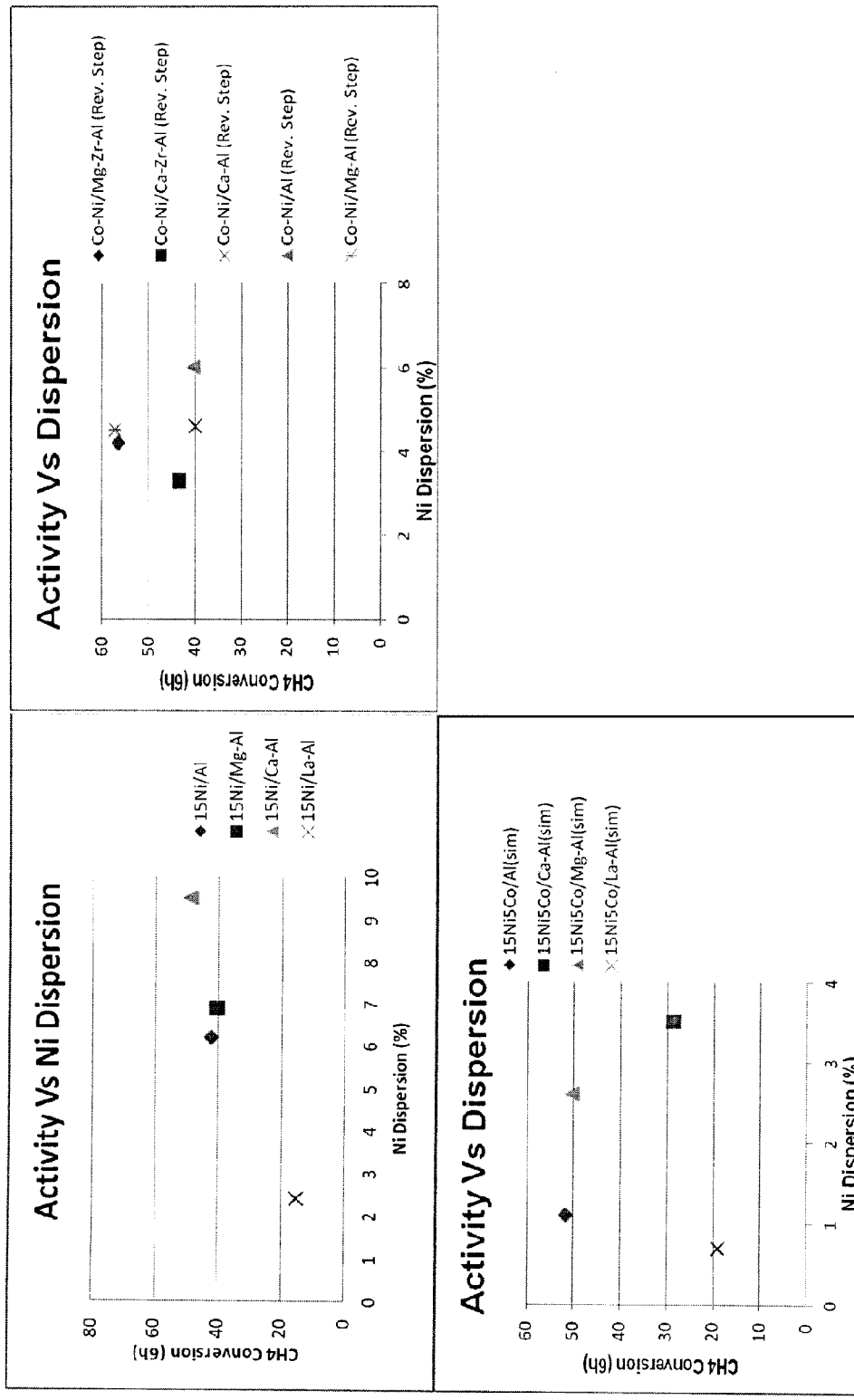
FIG. 12: graph showing Structure Activity Relationship (SAR) Plot for $CO_2$ Reforming of Biogas [Activity (mol. %) vs. Ni Dispersion (%)] using various exemplary catalysts of the application.
Figure 13:
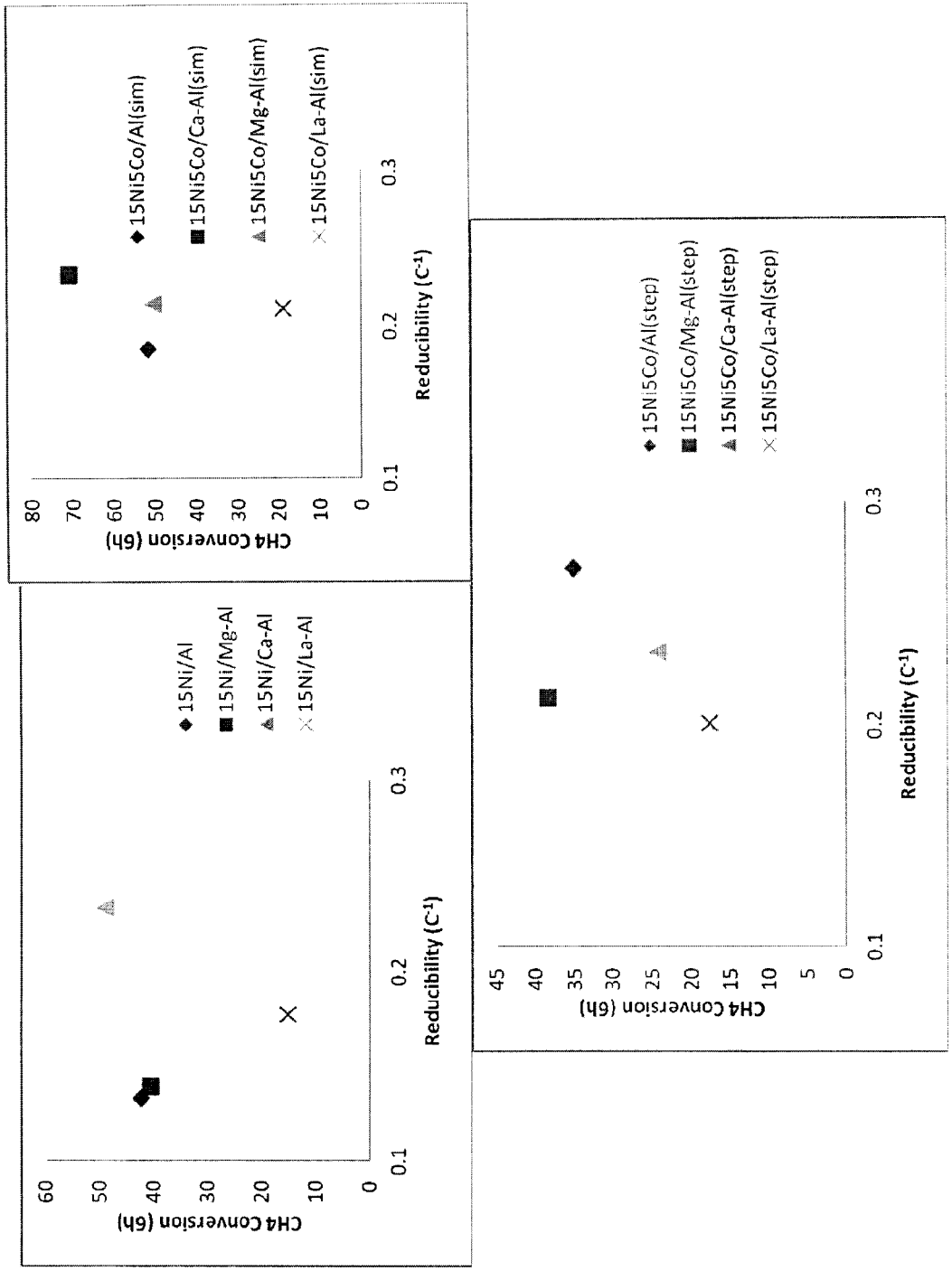
FIG. 13: graph showing Structure Activity Relationship (SAR) Plot for $CO_2$ Reforming of Biogas [Activity (mol. %) vs. Reducibility (° C.$^{-1}$)] using various exemplary catalysts of the application.
Figure 14:
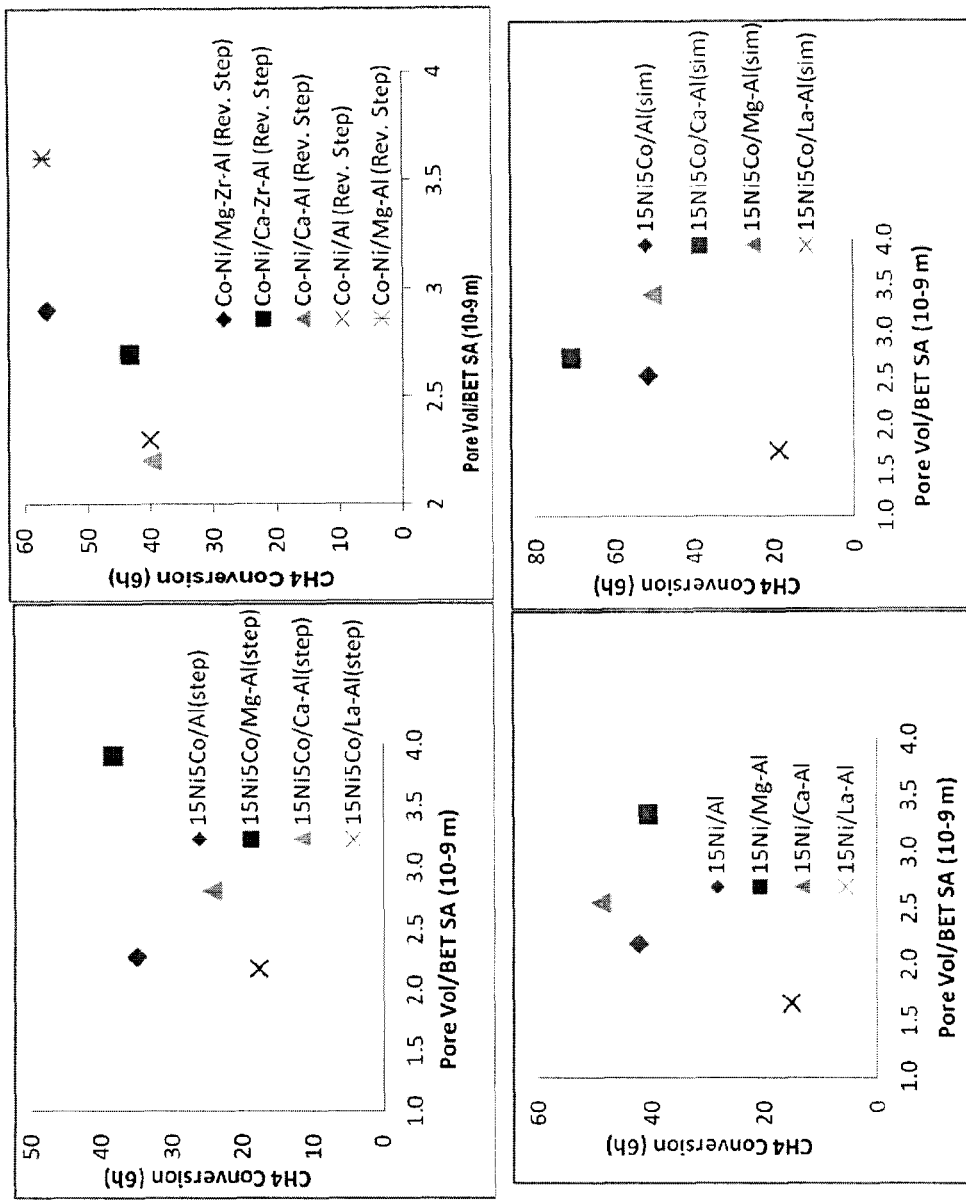
FIG. 14: graph showing Structure Activity Relationship (SAR) Plot for $CO_2$ Reforming of Biogas [Activity (mol. %) vs. Pore Volume/Surface Area (m)] using various exemplary catalysts of the application.

The effect of cobalt addition and also the sequence (order) of addition was investigated over the following alumina-based supports M$^1_a$O$_b$/Al$_2$O$_3$ (where M$^1$=Al, Ca, Mg) as shown in FIG. 11. This investigation yielded some interesting findings; firstly, it was noted that the addition of cobalt in a certain way promotes the CO$_2$ reforming of H$_2$S laden biogas. Secondly, the order in which the cobalt precursor is impregnated onto the support, plays a role in deciding the final fate of the resultant catalyst. While not wishing to be limited by theory, when the cobalt precursor is added prior to the addition of nickel precursor (reverse step-wise) or along with the nickel precursor (simultaneous impregnation), cobalt promotes the reaction/process by acting as a sacrificial element. However, when cobalt precursor is added after the impregnation of nickel precursor (step wise impregnation Ni→Co), then the addition of cobalt reduces the resultant catalytic activity as compared with the same support impregnated with Ni alone. From FIG. 11, it is noted that irrespective of support constitution employed (M$^1_a$O$_b$/Al$_2$O$_3$ (where M$^1$=Al, Ca, Mg), reverse stepwise impregnated (Co→Ni) catalysts are better than their stepwise (Ni→Co) impregnated counterparts. While not wishing to be limited by theory, this may mean that Co addition after Ni actually blocks some of the active Ni sites resulting in the loss of activity.

Figure 15:
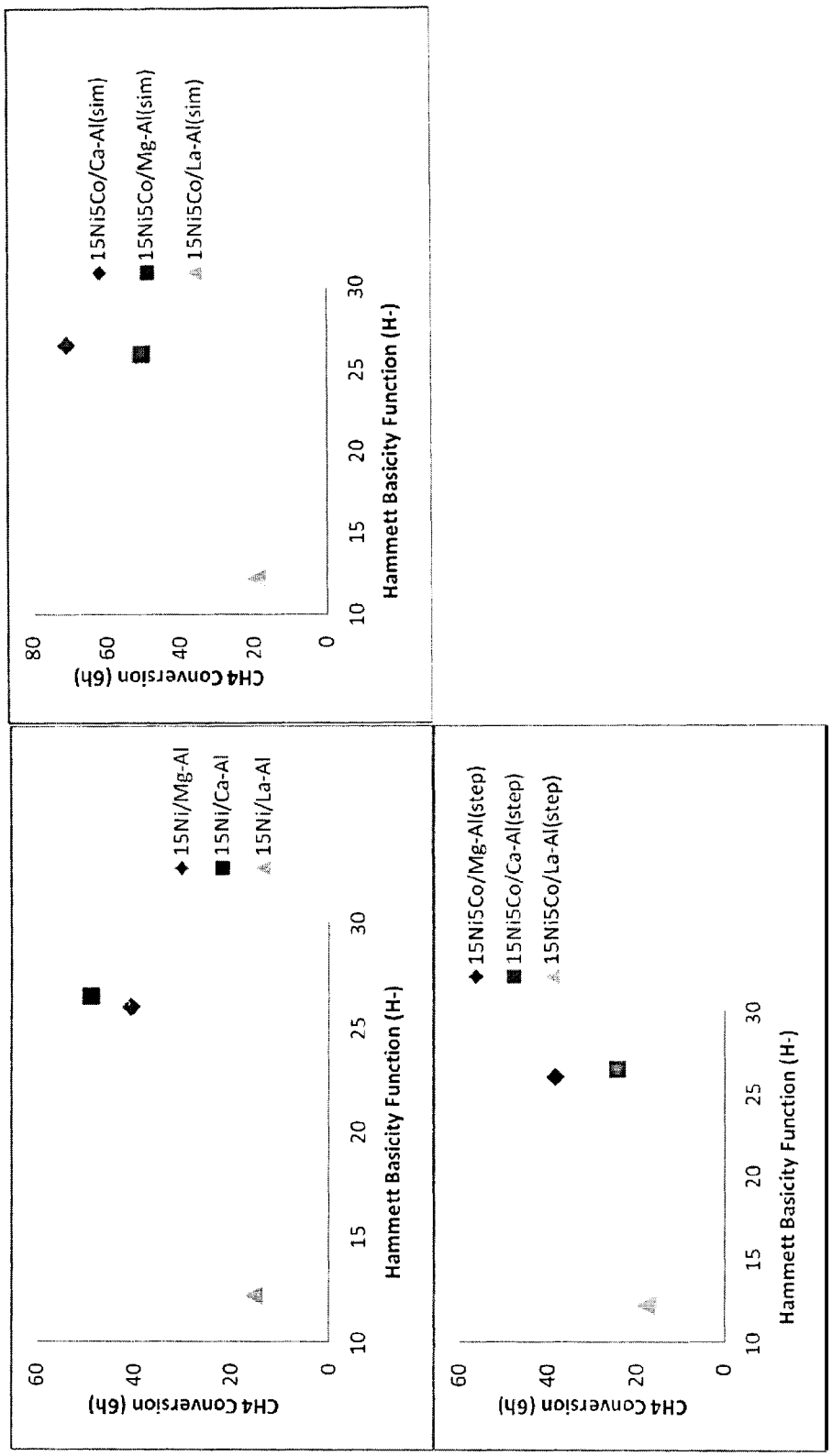
FIG. 15: graph showing Structure Activity Relationship (SAR) Plot for $CO_2$ Reforming of Biogas [Activity (mol. %) vs. Hammett Basicity Function (H.)] using various exemplary catalysts of the application.

In order to establish the uniqueness of the catalysts developed for biogas reforming, relationships between their resultant catalytic activity and their inherent textural and physico-chemical characteristics were formulated. These resultant relationships were termed as structure-activity relationships (SARs). The SARs aid in understanding the catalytic phenomena involved in this particular catalytic reforming process from the perspective of catalyst structure. Furthermore, the SARs are useful in determining the characteristics of the catalysts that contribute towards their unique performance in this catalytic process. SARs also help better understand the surface reactivity, shape selectivity, and hydrodynamic properties, and ultimately, help to establish the uniqueness of this catalyst system following the approach in the literature [32]. In the current study, SARs helped explain the significant difference in activity among the catalysts containing monometallic and bimetallic species, and among the bimetallic species, in the three different ways of impregnation, such as simultaneous, reverse stepwise and stepwise. The following parameters namely nickel dispersion; reducibility; pore volume/surface area; and Hammett basicity function (H.); were used to establish the SARs. These are presented in FIGS. 12, 13, 14, and 15 respectively. In the current work, the CH$_4$ conversion data at 6$^{th}$ h ToS was used as the activity data for plotting the various SARs. The Pore Volume/Surface Area were obtained from the desorption branch of N$_2$-isotherm (Table 2); the metallic dispersion values were obtained from the H$_2$ chemisorption studies (Table 3); lastly, the reducibility values were obtained from the TPR measurements, more specifically, the T$_{max}$ values pertaining to the reduction of NiO to Ni were used for calculating reducibility (where reducibility=1/T$_{max}$*100) (Table 2.). Finally, the Hammett basicity function (H.) values were obtained from the literature [33]. From the SARs (FIGS. 12-15), it can be inferred that high metal dispersion, high reducibility, high pore volume/surface area and residual basicity in the support are the characteristics that are optimal for good activity of the CO$_2$ reforming of methane hydrogen sulphide containing biogas. CO$_2$ reforming of biogas is a coke intensive reaction due to its high methane content (high C/H ratio). Coke formation is unwelcome in any given hydrocarbon process. Not only does it represent loss of product, but also, it leads to decreased heat transfer and to blockage. At high temperatures, carburization of metallic materials can occur, leading to catastrophic failure. Also, coking leads to deactivation of the catalysts, mass transfer problems, and increased pressure drop, thereby reducing the overall efficiency of the process. The residual basicity of the alumina-based supports was varied by the addition of basic oxide dopants (of varied basicity). The results obtained are presented in FIG. 15, from which it is clear that there is a direct relationship between the residual basicity of the support and the resultant activity for the CO$_2$ reforming of CH$_4$ from biogas.

The activity is a cumulative effect of the mentioned characteristics (textural, physico-chemical, surface, bulk, etc). The absence of a single desired trait, in a catalyst formulation could lead to poor performance. To conclude, by employing an improved preparation strategy, the current research has succeeded in bringing various desirable traits into a given catalyst formulation, thus leading to the development of "sulfur tolerant catalysts for the CO$_2$ reforming of CH$_4$ from biogas".

While the present disclosure has been described with reference to what are presently considered to be the preferred examples, it is to be understood that the disclosure is not limited to the disclosed examples. To the contrary, the disclosure is intended to cover various modifications and equivalent arrangements included within the spirit and scope of the appended claims.

TABLE 1

| Types of Impregnation | Catalyst (surfactant/metal = 0.5) |
| --- | --- |
| Monometallic (Ni) | Ni/Al$_2$O$_3$ |
|  | Ni/MgO—Al$_2$O$_3$ |
|  | Ni/CaO—Al$_2$O$_3$ |
|  | Ni/La$_2$O$_3$—Al$_2$O$_3$ |
| Bimetallic Simultaneous (Ni + Co) | Ni + Co/Al$_2$O$_3$ |
|  | Ni + Co/CaO—Al$_2$O$_3$ |
|  | Ni + Co/MgO—Al$_2$O$_3$ |
|  | Ni + Co/La$_2$O$_3$—Al$_2$O$_3$ |
|  | Ni + Co/Y$_2$O$_3$—Al$_2$O$_3$ |
|  | Ni + Co/Gd$_2$O$_3$—Al$_2$O$_3$ |
| Bimetallic Stepwise (Ni ⇒ Co) | Ni—Co/Al$_2$O$_3$ |
|  | Ni—Co/MgO—Al$_2$O$_3$ |
|  | Ni—Co/CaO—Al$_2$O$_3$ |
|  | Ni—Co/La$_2$O$_3$—Al$_2$O$_3$ |
| Bimetallic Reverse Stepwise (Co ⇒ Ni) | Co—Ni/Al$_2$O$_3$ |
|  | Co—Ni/CaO—Al$_2$O$_3$ |
|  | Co—Ni/MgO—Al$_2$O$_3$ |
|  | Co—Ni/CaO—ZrO$_2$—Al$_2$O$_3$ |
|  | Co—Ni/MgO—ZrO$_2$—Al$_2$O$_3$ |

TABLE 2

| S/M = 0.5 | SA (m²/g) | PV (cc/g) | Avg. PD (Å) | PV/SA ($10^{-9}$ m) | Ni Reducibility ($1/T_{max}$) ($10^{-3}$ °C$^{-1}$) |
|---|---|---|---|---|---|
| Supports | | | | | |
| $Al_2O_3$ | 199.2 | 0.40 | 61.0 | 2.0 | |
| $MgO$—$Al_2O_3$ | 173.2 | 0.57 | 121.4 | 3.3 | |
| $CaO$—$Al_2O_3$ | 157.8 | 0.62 | 126.5 | 3.9 | |
| $La_2O_3$—$Al_2O_3$ | 118.9 | 0.21 | 48.6 | 1.7 | |
| $CaO$—$ZrO_2$—$Al_2O_3$ | 259 | 0.65 | 86.5 | 2.5 | |
| $MgO$—$ZrO_2$—$Al_2O_3$ | 262 | 0.76 | 85.1 | 2.9 | |
| Monometallic Catalysts | | | | | |
| 15Ni/$Al_2O_3$ | 149.2 | 0.33 | 65.8 | 2.2 | 1.3 |
| 15Ni/MgO—$Al_2O_3$ | 130.2 | 0.43 | 113.9 | 3.3 | 1.4 |
| 15Ni/CaO—$Al_2O_3$ | 104.2 | 0.26 | 82.0 | 2.6 | 2.3 |
| 15Ni/$La_2O_3$—$Al_2O_3$ | 49.8 | 0.08 | 43.9 | 1.6 | 1.8 |
| Bimetallic Catalysts - Simultaneous Impregnation (Sim Ni + Co) | | | | | |
| 15Ni + 5Co/$Al_2O_3$ | 140.0 | 0.35 | 78.9 | 2.5 | 1.8 |
| 15Ni + 5Co/CaO—$Al_2O_3$ | 128.1 | 0.35 | 86.0 | 2.7 | 2.3 |
| 15Ni + 5Co/MgO—$Al_2O_3$ | 122.8 | 0.42 | 118.4 | 3.4 | 2.1 |
| 15Ni + 5Co/$La_2O_3$—$Al_2O_3$ | 52.8 | 0.09 | 45.9 | 1.7 | 2.1 |
| Bimetallic Catalysts - Stepwise Impregnation (Step Ni→Co) | | | | | |
| 15Ni→5Co/$Al_2O_3$ | 123.7 | 0.28 | 71.0 | 2.3 | 2.7 |
| 15Ni→5Co/MgO—$Al_2O_3$ | 102.4 | 0.40 | 136.2 | 3.9 | 2.1 |
| 15Ni→5Co/CaO—$Al_2O_3$ | 100.4 | 0.28 | 86.9 | 2.8 | 2.3 |
| 15Ni→5Co/$La_2O_3$—$Al_2O_3$ | 59.5 | 0.13 | 59.1 | 2.2 | 2.0 |
| Bimetallic Catalysts - Reverse Stepwise Impregnation (Rev. Step Co→Ni) | | | | | |
| 5Co→15Ni/MgO—$ZrO_2$—$Al_2O_3$ | 152.8 | 0.45 | 88.3 | 2.9 | nd |
| 5Co→15Ni/CaO—$ZrO_2$—$Al_2O_3$ | 129.3 | 0.35 | 84.3 | 2.7 | nd |
| 5Co—15Ni/CaO—$Al_2O_3$ | 129.2 | 0.29 | 72.7 | 2.2 | nd |
| 5Co→15Ni/$Al_2O_3$ | 125.9 | 0.28 | 66.6 | 2.2 | nd |
| 5Co→15Ni/MgO—$Al_2O_3$ | 109.3 | 0.39 | 125.3 | 3.6 | nd |
| Surfactant/Metal = 1.25 | | | | | |
| CaO—$Al_2O_3$ | 203.6 | 0.57 | 107.2 | 2.8 | — |
| 15Ni/CaO—$Al_2O_3$ | 117.3 | 0.35 | 91.8 | 3.0 | nd |

TABLE 3

| Surfactant/Metal = 0.5 | Ni Surface Area (m²/g) | Ni Dispersion (%) |
|---|---|---|
| Monometallic Catalysts (Ni) | | |
| Ni/$Al_2O_3$ | 6.2 | 6.2 |
| Ni/MgO—$Al_2O_3$ | 5.9 | 6.9 |
| Ni/CaO—$Al_2O_3$ | 7.6 | 9.5 |
| Ni/$La_2O_3$—$Al_2O_3$ | 2.1 | 2.4 |
| Simultaneous Impregnation (Ni + Co) | | |
| Ni + Co/$Al_2O_3$ | 1.4 | 1.1 |
| Ni + Co/MgO—$Al_2O_3$ | 2.9 | 2.6 |
| Ni + Co/CaO—$Al_2O_3$ | 3.0 | 3.5 |
| Ni + Co/$La_2O_3$—$Al_2O_3$ | 0.9 | 0.7 |
| Reverse Stepwise Impregnation (Co ⇒ Ni) | | |
| Co→Ni/$Al_2O_3$ | 3.4 | 6.0 |
| Co→Ni/MgO—$Al_2O_3$ | 5.4 | 4.5 |
| Co→Ni/MgO—$ZrO_2$—$Al_2O_3$ | 3.8 | 4.2 |
| Co→Ni/CaO—$Al_2O_3$ | 5.2 | 4.6 |
| Co→Ni/CaO—$ZrO_2$—$Al_2O_3$ | 5.0 | 3.3 |

TABLE 4

| Sample (CTAB = 0.5) | Wt. fraction metal (g metal/g cat.) | |
|---|---|---|
| | Ni* | Co# |
| Monometallic Catalysts (Ni) | | |
| Ni/$Al_2O_3$ | 0.15 | — |
| Ni/MgO—$Al_2O_3$ | 0.13 | — |
| Ni/CaO—$Al_2O_3$ | 0.12 | — |
| Ni/$La_2O_3$—$Al_2O_3$ | 0.13 | — |
| Bimetallic Catalysts - Simultaneous Impregnation (Ni + Co) | | |
| Ni + Co/$Al_2O_3$ | 0.14 | 0.042 |
| Ni + Co/MgO—$Al_2O_3$ | 0.13 | 0.038 |
| Ni + Co/CaO—$Al_2O_3$ | 0.10 | 0.029 |
| Ni + Co/$La_2O_3$—$Al_2O_3$ | 0.14 | 0.043 |
| Bimetallic Catalysts - Stepwise Impregnation (Ni ⇒ Co) | | |
| Ni→Co/$Al_2O_3$ | 0.11 | 0.041 |
| Ni→Co/MgO—$Al_2O_3$ | 0.14 | 0.050 |
| Ni→Co/CaO—$Al_2O_3$ | 0.13 | 0.037 |
| Ni→Co/$La_2O_3$—$Al_2O_3$ | 0.11 | 0.039 |
| Bimetallic Catalysts - Reverse Stepwise Impregnation (Co ⇒ Ni) | | |
| Co→Ni/$Al_2O_3$ | 0.07 | 0.016 |
| Co→Ni/MgO—$Al_2O_3$ | 0.14 | 0.040 |
| Co→Ni/CaO—$Al_2O_3$ | 0.13 | 0.038 |

TABLE 4-continued

| Sample | Wt. fraction metal (g metal/g cat.) | |
|---|---|---|
| (CTAB = 0.5) | Ni* | Co# |
| Co→Ni/MgO—ZrO$_2$—Al$_2$O$_3$ | 0.11 | 0.027 |
| Co→Ni/CaO—ZrO$_2$—Al$_2$O$_3$ | 0.18 | 0.049 |
| S/M = 1.25 | | |
| Ni/CaO—Al$_2$O$_3$ | 0.14 | — |

Nominal metal loading 15 wt. % Ni and 5 wt. % Co;
*0.15 g/g cat.;
0.05 g/g cat.

TABLE 5

| Favourable Catalysts | CH$_4$ Conversion mol. % (6$^{th}$ h data) | H$_2$ Selectivity mol. % (6$^{th}$ h data) |
|---|---|---|
| Co→Ni/MgO—Al$_2$O$_3$ (Reverse step-wise) | 57.1 | 96.7 |
| Co→Ni/MgO—ZrO$_2$—Al$_2$O$_3$ (Reverse step-wise) | 56.5 | 98.4 |
| Ni + Co/Al$_2$O$_3$ (Simultaneous) | 51.7 | 92.0 |
| Ni + Co/MgO—Al$_2$O$_3$ (Simultaneous) | 50.9 | 92.2 |
| Ni/CaO—Al$_2$O$_3$ (Monometallic) | 49.0 | 94.3 |
| Co→Ni/CaO—ZrO$_2$—Al$_2$O$_3$ (Reverse step-wise) | 43.4 | 94.3 |
| Ni/Al$_2$O$_3$ (Monometallic) | 42.3 | 89.7 |
| Ni/MgO—Al$_2$O$_3$ (Monometallic) | 40.6 | 89.1 |
| Co→Ni/Al$_2$O$_3$ (Reverse step-wise) | 40.2 | 86.9 |
| Co→Ni/CaO—Al$_2$O$_3$ (Reverse step-wise) | 39.9 | 84.7 |
| Ni→Co/MgO—Al$_2$O$_3$ (Step-wise) | 37.5 | 89.8 |
| Ni→Co/Al$_2$O$_3$ (Step-wise) | 35.0 | 89.6 |
| Ni + Co/CaO—Al$_2$O$_3$ (Simultaneous) | 28.7 | 78.3 |
| N→Co/CaO—Al$_2$O$_3$ (Step-wise) | 22.3 | 86.4 |

FULL CITATIONS FOR DOCUMENTS REFERRED TO IN THE APPLICATION

1. S. Rasi, A. Veijanen, J. Rintala, *Energy* 32 (2007), pp. 1375-1380.
2. D. T. Shindell, G. Faluvegi, D. M. Koch, G. A. Schmidt, N. Unger, S. E. Bauer, (2009). "Improved Attribution of Climate Forcing to Emissions". *Science* 326 (5953): 716.
3. R. Bove and P. Lunghi, *Energy Convers. Manage.* 47 (2006), pp. 1391-1401
4. C. H. Bartolomew, *Appl. Catal. A* 212 (2001), pp. 17-60.
5. Scottish Environment Protection Agency. Guidance on Landfill Gas Flaring. November 2002.
6. U.S. Environmental Protection Agency. "Project Technology Options." LFG Energy Project Development Handbook. September 2009.
7. R. Dewil, L. Appels and J. Baeyens, *Energy Convers. Manage.* 47 (2006), pp. 1711-1722.
8. World Bank Issue Brief/GGFR (www.worldbank.org/ggfr).
9. Mollersten, K.; Yan, J.; Moreira, J. R. Potential market niches for biomass energy with CO$_2$ capture and storage opportunities for energy supply with negative CO$_2$ emissions. *Biomass Bioenergy* 2005, 25, 273-285.
10. J. R. Rostrup-Nielsen, and T. Rostrup-Nielsen, Large-scale hydrogen production. *CATTECH* 2002, 6, 150-159.
11. P. Thanawala (City of Regina), "Asserting Carbon Offsets from Landfill Gas Flaring at Regina's Landfill Site", Presented at SWANA 5$^{th}$ Canadian Waste Symposium, Banff, Alberta, Apr. 21, 2010.
12. Rostrup-Nielsen, J. R., Pedersen, K., Sehested, J., (2007), High temperature methanation sintering and structure sensitivity. Applied Catalysis A: General, 330, 134-138.
13. Gallego, J., Dupeyrat, C. B., Barrault, J., Mondragon, F., (2009), Severe deactivation of a LaNiO$_3$ perovskite-type catalyst precursor with H$_2$S during methane dry reforming. Energy and Fuels, 23, 4883-4886.
14. Rostrup-Nielsen, J. R., & Hansen, J. H. B. (1993). CO$_2$ reforming of methane over transition metals, Journal of Catalysis, 144, 38-49; Rostrup-Nielsen, J. R. (1994). Aspects of CO$_2$-reforming of methane, Studies in Surface Science and Catalysis, 81, 25-41.
15. Tsang, S. C., Claridge, J. B., Green, M. L. H., Recent advances in the conversion of methane to synthesis gas, Catalysis Today 23 (1995) 3-15.
16. Goldwasser, M. R., Rivas, M. E., Pietri, E., Perez-Zurita, M. J., Cubeiro, M. L., Gingembre, L., Leclercq, L., Leclercq, G., (2003), perovskites as catalysts precursors: CO$_2$ reforming of CH$_4$ on Ln$_{1-x}$Ca$_x$Ru$_{0.8}$Ni$_{0.2}$O$_3$ (Ln=La, Sm, & Nd). Applied Catalysis A: General 255 pp. 45-57.
17. Safariamin, M., Tidahy, L. H., Abi-Aad, E., Siffert, S., Aboukais, A., (2009), Dry reforming of methane in the presence of ruthenium-based catalysts. C. R. Chimie 12, p. 748-753.
18. Ashrafi, M., Pfeifer, C., Proll, T., Hofbauer, H. (2008) Energy and Fuels, 22, pp. 4190-4195.
19. Qin, D., and Lapszewicz, J., (1994), Study of mixed steam and CO$_2$ reforming of CH$_4$ to Syngas on MgO-support metals. Catalysis Today, 21 (1994) 551-560.
20. Kolbitsch, P., Pfeifer, C., Hofbauer, H., (2007), Catalytic steam reforming of model biogas. Fuel, 87, pp. 701-706.
21. Harasimowicz, M., Orluk, P., Trznadel, G. Z., Chmielewski, A. G., (2007), Application of polyimide membranes for biogas purification and enrichment, Journal of Hazardous Materials, 144, pp. 698-702.
22. R. O. Idem, A. Khan, H. Ibrahim, P. Tontiwachwuthikul, T. Srisuwan, A. Zahid, F. Khan, P. Sengupta, B. Saha Catalyst for Feedstock and Process Flexible Hydrogen Production, PCT Application Publication No. WO/2011/10687.
23. R. O Idem, P. Kumar, Y. Sun, 'Catalysts for Hydrogen Production' U.S. Pat. No. 7,824,656 B2, Nov. 2, 2010.
24. Kumar, P.; Sun, Y.; Idem, R. O. Energy Fuels 2008, 22, 3575-3582.
25. Kumar, P.; Sun, Y.; Idem, R. O. Energy Fuels 2007, 21, 3133-3123.
26. Akpan, E.; Sun, Y.; Kumar, P.; Ibrahim, I.; Aboudheir, A.; Idem, R. Chem. Eng. Sci. 2007, 62, 4012-4024.
27. T. Sukonket, A. Khan, B. Saha, P. Kumar, H. Ibrahim, S. Tantayanon, R. Idem, Energy Fuels, 2011, 25, 864-877.
28. A. Khan, T. Sukonket, B. Saha, R. Idem, *Energy Fuels* 26 (2012) 365-379.
29. Iglesia, E.; Boudart, M. J. Catal. 1983, 81, 204-213.
30. Tsay, M.-T.; Chang, F.-W. Appl. Catal. A 2000, 203, 15-22.
31. G. F. Froment, K. B. Bischoff, *Chemical Reactor Analysis and Design*, 2$^{nd}$ ed.; Wiley: New York, 1990.
32. Alfons Balker, Heterogeneous Catalysis—An Interdisciplinary Approach, Chimia 55 (2001) 796.
33. H. Hattori, Heterogeneous Basic Catalysis, Chem. Rev. 1995, 95, 537-550.

The invention claimed is:
1. A catalyst comprising from about 5 wt % to about 20 wt % Ni and 0 wt % to about 10 wt % Co supported on a support having a formula:

$M^1{}_aO_b$—ZrO$_2$—Al$_2$O$_3$, wherein $M^1_aO_b$ is a metal oxide salt in which a is 1 and b is 1 or 2, or a is 2 and b is 3; and $M^1$ is selected from Mg and Ca.

2. The catalyst of claim 1, wherein the Ni is present in the catalyst in an amount (wt % based on the weight of the total catalyst) of about 10, 10.5, 11, 11.5, 12, 12.5, 13, 13.5, 14, 14.5 or 15 weight percent.

3. The catalyst of claim 1, wherein the Co is present in the catalyst in an amount (wt % based on the weight of the total catalyst) of about 0.5, 1, 1.5, 2, 2.5, 3, 3.5, 4, 4.5, 5, 5.5, 6, 6.5, 7, 7.5 or 8 weight percent.

4. The catalyst of claim 1, wherein the Co is not present in the catalyst.

5. The catalyst of claim 1, wherein the Ni and Co are present in the prepared catalyst in the form of an oxide and, prior to use as a catalyst the catalysts are treated under reducing conditions to provide an active form of the metal.

6. The catalyst of claim 1 selected from:

5% Co→15% Ni/MgO—$ZrO_2$—$Al_2O_3$; and

5% Co→15% Ni/CaO—$ZrO_2$—$Al_2O_3$, wherein the "Co→Ni" means that the catalyst is prepared using a reverse step-wise impregnation method with Co being impregnated on the support prior to Ni and the support is prepared using the surfactant assisted method with a surfactant/metal ratio of 0.5.

7. The catalyst of claim 1, wherein the support is prepared using a surfactant assisted method.

8. The catalyst of claim 7, wherein the surfactant assisted method comprises: (i) combining aqueous solutions of precursor salts of each metal oxide, with an aqueous solution of at least one surfactant; (ii) stirring the combination for a suitable time; (iii) adding a suitable base to adjust the pH of the combined solutions to about 10 to about 13 to produce a slurry comprising precipitated support; (iv) allowing the slurry to age at elevated temperatures for a suitable time; (v) isolating the precipitated support from the slurry; (vi) optionally washing the isolated support to remove residual surfactant or solvent and (vii) drying and calcining the isolated support.

9. The catalyst of claim 8, wherein the molar ratio of surfactant to metal precursor (surfactant/[$M^1$+Zr+Al]) is about 0.1 to about 5, about 0.2 to 2, about 0.3 to about 1.25, or about 0.3.

10. The catalyst of claim 1, wherein the Ni and Co, when present, are added to the support using a wet impregnation method.

11. The catalyst of claim 10, wherein the wet impregnation method comprises immersing support in aqueous solutions of metal precursors and stirring and heating under drying conditions.

12. The catalyst of claim 11, wherein the metal precursors are nitrate salts.

13. The catalyst of claim 10, wherein, when both Ni and Co are present, the support is impregnated with the metals using a reverse step-wise, simultaneous or step-wise impregnation method.

14. The catalyst of claim 13, wherein the support is impregnated with the metals using a reverse step-wise or simultaneous impregnation method.

15. The catalyst of claim 1, wherein $M^1_aO_b$ is MgO or CaO.

16. The catalyst of claim 1, wherein Ni is present in the catalyst in an amount of about 13, 13.5, 14, 14.5, 15, 15.5, 16, 16.5 or 17 weight percent.

17. The catalyst of claim 1, wherein Co is present in the catalyst in an amount of about 4, 4.5, 5, 5.5 or 6 weight percent.

18. A process for the conversion of a methane-rich gaseous mixture into hydrogen comprising (a) activating a catalyst as defined in claim 1 under reducing conditions; and (b) contacting a reactant comprising the methane-rich gaseous mixture with the activated catalyst under conditions for the conversion of the methane-rich gaseous mixture into a product comprising hydrogen.

19. The process of claim 18, wherein the methane-rich gaseous mixture is a biogas.

20. The process of claim 18, wherein the methane-rich gaseous mixture comprises $H_2S$ and/or organosulfur compounds.

* * * * *